(12) United States Patent
Shi et al.

(10) Patent No.: US 10,996,670 B2
(45) Date of Patent: May 4, 2021

(54) ELECTRIC UNMANNED AERIAL VEHICLE AND AN INTELLIGENT METHOD OF PROTECTING ELECTRICITY THEREOF

(71) Applicant: SZ DJI TECHNOLOGY CO., LTD., Shenzhen (CN)

(72) Inventors: Renli Shi, Shenzhen (CN); Jianyu Song, Shenzhen (CN); Xi Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/531,302

(22) Filed: Aug. 5, 2019

(65) Prior Publication Data
US 2019/0377338 A1    Dec. 12, 2019

Related U.S. Application Data

(63) Continuation of application No. 15/406,005, filed on Jan. 13, 2017, now Pat. No. 10,372,124, which is a
(Continued)

(51) Int. Cl.
 *G05D 1/00* (2006.01)
 *B64C 39/02* (2006.01)
 *B64D 27/24* (2006.01)

(52) U.S. Cl.
 CPC ......... *G05D 1/0055* (2013.01); *B64C 39/024* (2013.01); *B64D 27/24* (2013.01);
 (Continued)

(58) Field of Classification Search
 CPC .. G05D 1/0055; G05D 1/0088; B64C 39/024; B64C 2201/042; B64C 2201/145; B64D 27/24
 See application file for complete search history.

(56) References Cited

U.S. PATENT DOCUMENTS 8,511,606 B1    8/2013  Lutke et al.
8,948,935 B1 *  2/2015  Peeters ............... B64D 1/22
                                              701/3
(Continued)

FOREIGN PATENT DOCUMENTS

CN    201348739 Y    11/2009
CN    101866180 A    10/2010
(Continued)

OTHER PUBLICATIONS

Machine Translation of CN 202929383, retrieved from WIPO on Oct. 14, 2018 (Year: 2018).
(Continued)

*Primary Examiner* — Thomas Ingram
(74) *Attorney, Agent, or Firm* — Anova Law Group, PLLC

(57) ABSTRACT

An electric unmanned aerial vehicle includes a position sensor, a memory, and a controller in communication with the position sensor and the memory. The position sensor is configured to obtain coordinate information of a present position of the electric unmanned aerial vehicle in real-time. The coordinate information includes a plane coordinate on a horizontal plane and a height coordinate in a vertical direction. The memory stores coordinate information of a preset position of the electric unmanned aerial vehicle. The controller is configured to calculate a safety electricity amount needed by the electric unmanned aerial vehicle to perform a safety protection command based on the plane coordinate and the height coordinate, compare the safety electricity amount with a present remaining electricity amount of a battery of the electric unmanned aerial vehicle, and perform a safety protection command if the present remaining electricity amount is not greater than the safety electricity amount.

20 Claims, 5 Drawing Sheets

Related U.S. Application Data continuation of application No. PCT/CN2014/082350, filed on Jul. 16, 2014.

(52) U.S. Cl.
CPC ...... *G05D 1/0088* (2013.01); *B64C 2201/042* (2013.01); *B64C 2201/145* (2013.01)

(56) References Cited

U.S. PATENT DOCUMENTS

| | | | |
|---|---|---|---|
| 2003/0093193 | A1 | 5/2003 | Pippenger |
| 2003/0234320 | A1* | 12/2003 | Colting .............. B64C 39/024 244/96 |
| 2004/0256519 | A1 | 12/2004 | Ellis et al. |
| 2006/0106506 | A1 | 5/2006 | Nichols et al. |
| 2006/0167599 | A1 | 7/2006 | Bodin et al. |
| 2011/0071706 | A1 | 3/2011 | Crumm et al. |
| 2013/0009765 | A1 | 1/2013 | Gilman et al. |
| 2013/0065629 | A1* | 3/2013 | Zhu .................... H04W 52/241 455/522 |
| 2013/0085629 | A1 | 4/2013 | Washington et al. |
| 2014/0032034 | A1* | 1/2014 | Raptopoulos ........ G05D 1/0088 701/25 |
| 2014/0303814 | A1* | 10/2014 | Burema ............... A01B 79/005 701/3 |

FOREIGN PATENT DOCUMENTS

| | | |
|---|---|---|
| CN | 102412530 A | 4/2012 |
| CN | 102768341 A | 11/2012 |
| CN | 102955478 A | 3/2013 |
| CN | 202929383 U | 5/2013 |
| CN | 103332296 A | 10/2013 |
| CN | 103592949 A | 2/2014 |
| CN | 103612756 A | 3/2014 |
| JP | 04039995 U | 4/1992 |
| JP | 2002166895 A | 6/2002 |
| JP | 2002308190 A | 10/2002 |
| JP | 2006082774 A | 3/2006 |
| JP | 2007525371 A | 9/2007 |
| JP | 2011240745 A | 12/2011 |
| JP | 2012037204 A | 2/2012 |
| JP | 2014031118 A | 2/2014 |

OTHER PUBLICATIONS

The European Patent Office (EPO) The Extended European Search Report for 14897514.7 Aug. 25, 2017 8 Pages.
The Wolrd Intellectual Property Organization (WIPO) International Search Report for PCT/CN2014/082350 Feb. 6, 2015 6 Pages.

* cited by examiner

ELECTRIC UNMANNED AERIAL VEHICLE AND AN INTELLIGENT METHOD OF PROTECTING ELECTRICITY THEREOF

CROSS-REFERENCE TO RELATED APPLICATIONS

This application is a continuation of application Ser. No. 15/406,005, filed on Jan. 13, 2017, which is a continuation application of International Application No. PCT/CN2014/082350, filed on Jul. 16, 2014, the entire contents of both of which are incorporated herein by reference.

TECHNICAL FIELD

The present disclosure relates to an unmanned aerial vehicle, and in particular, to an electric unmanned aerial vehicle and an intelligent method of protecting electricity of the electric unmanned aerial vehicle.

BACKGROUND

In traditional electric unmanned aerial vehicles, an amount of electricity of a battery can be prompted to a user in two ways: presenting a real-time voltage value of the battery, or presenting a real-time percentage of a remaining battery electricity.

Extensive experience is required to determine remaining electricity of a battery from a voltage value of the battery, thus only those skilled are able to determine a state of the battery from a voltage value of the battery. On the other hand, determining the remaining electricity of the battery by looking at a current electricity percentage is more intuitive. Either way, when the battery is in a low electricity state or an exhausted state, an alarm can be triggered. For example, an LED lamp can flash a red light, or a beeper can make a sound.

The conventional low voltage alarms are implemented by determining whether the battery reaches a preset low voltage value based on a fixed reference voltage value. For a beginning user of an unmanned aerial vehicle in aerial photography, an alarm for battery electricity cannot be received if the electric unmanned aerial vehicle flies to a remote position. In addition, it can be difficult to calculate the needed electricity for the electric unmanned aerial vehicle to return to an initial point from the present position. Consequently, the electric unmanned aerial vehicles may crash in a return trip, or be forced to return earlier than necessary, resulting in a lower battery utilization.

SUMMARY

In view of above problems in the conventional technologies, there is a need to provide an intelligent method of managing electricity for an electric unmanned aerial vehicle. The intelligent method can protect the electric unmanned aerial vehicle in a real-time, effective and intelligent manner, prevent accidents due to an insufficient electricity, and improve a utilization of a battery.

An intelligent method of managing electricity for an electric unmanned aerial vehicle is provided. The method can comprise: obtaining a present remaining electricity amount of a battery in real-time; obtaining coordination information of a present position of the electric unmanned aerial vehicle in real-time, and calculating a safety electricity amount needed by the electric unmanned aerial vehicle to perform a safety protection command at the present position based on the coordinate information of the present position of the electric unmanned aerial vehicle; determining whether the present remaining electricity amount is greater than the safety electricity amount; and performing a corresponding safety protection command if the present remaining electricity amount is not greater than the safety electricity amount.

Advantages of the above-described intelligent methods of managing electricity for an electric unmanned aerial vehicle can at least include the followings (1) With the above-described intelligent method of managing electricity for an electric unmanned aerial vehicle, a safety electricity amount needed by the electric unmanned aerial vehicle to perform a safety protection command at a present position can be calculated by obtaining coordination information of the present position of the electric unmanned aerial vehicle in real-time. If the present remaining electricity amount of the battery is not greater than the safety electricity amount, a corresponding safety protection command can be immediately performed, such that the electric unmanned aerial vehicle can be protected in real-time, and prevented from accidents due to an insufficient electricity of the electric unmanned aerial vehicle.

(2) With the above-described intelligent method of managing electricity for an electric unmanned aerial vehicle, a determination can be automatically made on whether a safety protection command is to be performed based on a comparison of the safety electricity amount of the present position with the present remaining electricity amount of the battery. The user is free of determining based on his/her experience, such that the electric unmanned aerial vehicle can be protected more effectively and intelligently with the above-described intelligent method of managing electricity.

(3) With the above-described intelligent method of managing electricity for an electric unmanned aerial vehicle, the safety electricity amount can be updated in real-time based on the coordinate information of the present position. The electric unmanned aerial vehicle does not perform an early return flight or an early landing, such that a utilization of the battery can be improved.

In some embodiments, the safety electricity amount can comprise at least one of an amount of electricity needed by the electric unmanned aerial vehicle to return from the present position to a preset position, an amount of electricity needed by the electric unmanned aerial vehicle to land from the present position, or an amount of electricity needed by the electric unmanned aerial vehicle to deploy a safety device. The safety protection command can comprise at least one of a command of returning to the preset position, a command of landing from the present position, or a command of deploying the safety device.

In some embodiments, the process of calculating the amount of electricity needed by the electric unmanned aerial vehicle to land from the present position can comprises: obtaining an initial amount of electricity of the battery and a flight time, and calculating an electricity consumption rate of the battery under current flight parameters; calculating a vertical height of the electric unmanned aerial vehicle from the present position to a take-off point based on the coordinate information of the present position and coordination information of the take-off point; calculating a time needed by the electric unmanned aerial vehicle to land from the present position based on the vertical height; and calculating the amount of electricity needed by the electric unmanned aerial vehicle to land from the present position based on (1) the electricity consumption rate of the battery under current flight parameters and (2) the time needed by the electric unmanned aerial vehicle to land from the present position.

In some embodiments, the amount of electricity needed by the electric unmanned aerial vehicle to land from the present position can comprise a reserved electricity.

In some embodiments, a path of the electric unmanned aerial vehicle to return from the present position to the preset position can be one of an original flight path, a linear path in a horizontal direction and a linear path in a vertical direction between the present position and the preset position, or a linear path between the present position and the preset position.

In some embodiments, in the process of calculating the amount of electricity needed by the electric unmanned aerial vehicle to return from the present position to the preset position, the electric unmanned aerial vehicle can automatically select a return path according to a preset criterion, and calculates an amount of electricity needed by the electric unmanned aerial vehicle to return from the present position to the preset position along the selected return path.

In some embodiments, the preset criterion can comprise at least one of a path having the least electricity consumption, a path having the shortest return trip, or a path having the least speed changes.

In some embodiments, the preset criterion can be a path having the least electricity consumption, and the process of calculating the amount of electricity needed by the electric unmanned aerial vehicle to return from the present position to the preset position can further comprises: calculating an electricity consumption of the electric unmanned aerial vehicle along various paths from the present position to the preset position; and calculating an return path electricity consumption of different paths, the return path electricity consumption comprising an electricity consumption corresponding to a path, and automatically selecting a path having the least return path electricity consumption as the return path.

In some embodiments, a path of the electric unmanned aerial vehicle to return from the present position to the preset position can be automatically set or set by a user.

In some embodiments, the process of calculating the amount of electricity needed by the electric unmanned aerial vehicle to return from the present position to the preset position can comprises: obtaining an initial amount of electricity of the battery and a flight time, and calculating an electricity consumption rate of the battery under current flight parameters; calculating a horizontal distance and a vertical height of the electric unmanned aerial vehicle to return from the present position to the preset position based on the coordinate information of the present position and the coordinate information of the preset position; calculating a time needed by the electric unmanned aerial vehicle to return from the present position to the preset position based on the horizontal distance and the vertical height; and calculating the amount of electricity needed by the electric unmanned aerial vehicle to return from the present position to the preset position based on (1) the electricity consumption rate of the battery under current flight parameters, and (2) the time needed by the electric unmanned aerial vehicle to return from the present position to the preset position.

In some embodiments, the process of calculating the amount of electricity needed by the electric unmanned aerial vehicle to return from the present position to the preset position can comprise calculating an amount of electricity needed for the horizontal distance and calculating an amount of electricity needed for the vertical height, the amount of electricity needed for the horizontal distance can comprise a first reserved electricity, and the amount of electricity needed for the vertical height can comprise a second reserved electricity.

In some embodiments, the preset position can be a waypoint in a flight path which is recorded by the electric unmanned aerial vehicle, the process of calculating the amount of electricity needed by the electric unmanned aerial vehicle to return from the present position to the preset position can comprise: obtaining an initial amount of electricity of the battery and a flight time, and calculating an electricity consumption rate of the battery under current flight parameters; calculating a total distance for the electric unmanned aerial vehicle to return from the present position to the preset position along the original flight path based on the coordinate information of the present position and the coordinate information of the preset position; calculating a time needed by the electric unmanned aerial vehicle to return from the present position to the preset position along the original flight path based on the total distance of the electric unmanned aerial vehicle to return from the present position to the preset position along the original flight path; and calculating an amount of electricity needed by the electric unmanned aerial vehicle to return from the present position to the preset position along the original flight path based on (1) the electricity consumption rate of the battery under current flight parameters, and (2) the time needed by the electric unmanned aerial vehicle to return from the present position to the preset position along the original flight path.

In some embodiments, the amount of electricity needed by the electric unmanned aerial vehicle to return from the present position to the preset position along the original flight path can comprise a reserved electricity.

In some embodiments, a time needed by the electric unmanned aerial vehicle during landing can be calculated based on a total descending height and a descending speed of the electric unmanned aerial vehicle; and in the process of descending, the vertical speed of the electric unmanned aerial vehicle can vary at a plurality of preset heights.

In some embodiments, the plurality of preset heights can comprise a first preset height and a second preset height; the electric unmanned aerial vehicle can descend to the first preset height at a uniform speed, gradually decelerate and descend to the second preset height, and descend to the ground at a uniform speed.

In some embodiments, the first preset height and the second preset height can be measured by a distance-measuring sensor carried by the electric unmanned aerial vehicle, or set by a user in advance according to the total descending height.

In some embodiments, the electricity consumption rate of the battery under the present flight parameters can be obtained by measuring the present remaining electricity amount multiple times at a preset time interval $\Delta t$ and averaging the plurality of measurements. An electricity consumption rate at the $n^{th}$ preset time interval $\Delta t$ is $(Q0-Qn)/n \times \Delta t$, where $Q0$ is an initial amount of electricity of the battery, and $Qn$ is a present remaining electricity amount of the battery as measured after the $n^{th}$ preset time interval $\Delta t$.

In some embodiments, the preset position can be a take-off point of the electric unmanned aerial vehicle or a target point specified by a user.

In some embodiments, the present remaining electricity amount of the battery is calculated by subtracting a preset electricity from an actual remaining electricity amount of the battery, and the preset electricity is used as a compensation for a computing error of the safety electricity amount.

In some embodiments, the present remaining electricity amount of the battery can be obtained by sampling a voltage with an AD sampling circuit and/or by measuring a current with a current meter.

The present disclosure provides an intelligent method of managing electricity for an electric unmanned aerial vehicle.

The intelligent method of managing electricity for an electric unmanned aerial vehicle can comprise: obtaining a present remaining electricity amount of a battery in real-time; obtaining coordination information of a present position of the electric unmanned aerial vehicle in real-time, and calculating an amount of electricity needed by the electric unmanned aerial vehicle to land from the present position and an amount of electricity needed by the electric unmanned aerial vehicle to return from the present position to a preset position based on the coordinate information of the present position of the electric unmanned aerial vehicle and coordination information of the preset position; determining whether the present remaining electricity amount is greater than the amount of electricity needed by the electric unmanned aerial vehicle to land from the present position; automatically performing a command of landing from the present position if the present remaining electricity amount is not greater than the amount of electricity needed by the electric unmanned aerial vehicle to land from the present position; determining whether the present remaining electricity amount is greater than the amount of electricity needed by the electric unmanned aerial vehicle to return from the present position to the preset position, if the present remaining electricity amount is greater than the amount of electricity needed by the electric unmanned aerial vehicle to land from the present position; and continuing a normal fly if the present remaining electricity amount is greater than the amount of electricity needed by the electric unmanned aerial vehicle to return from the present position to the preset position.

Advantages of the above-described intelligent methods of managing electricity for an electric unmanned aerial vehicle can at least include the following.

(1) With the above-described intelligent method of managing electricity for an electric unmanned aerial vehicle, a safety electricity amount needed by the electric unmanned aerial vehicle to perform a safety protection command at a present position can be calculated by obtaining coordination information of the present position of the electric unmanned aerial vehicle in real-time. If the present remaining electricity amount of the battery is not greater than the safety electricity amount, a corresponding safety protection command can be performed immediately, such that the electric unmanned aerial vehicle can be protected in real-time, and prevented from accidents due to an insufficient electricity of the electric unmanned aerial vehicle.

(2) With the above-described intelligent method of managing electricity for an electric unmanned aerial vehicle, a determination can be automatically made on whether a safety protection command is to be performed based on a comparison of the safety electricity amount of the present position with the present remaining electricity amount of the battery. The user is free of determining based on his/her experience, such that the electric unmanned aerial vehicle can be protected more effectively and intelligently with the above-described intelligent method of managing electricity.

(3) With the above-described intelligent method of managing electricity for an electric unmanned aerial vehicle, the safety electricity amount can be updated in real-time based on the coordinate information of the present position. The electric unmanned aerial vehicle does not perform an early return flight or an early landing, such that a utilization of the battery can be improved.

(4) Two different levels of alarm electricity are set in the intelligent method of managing electricity for an electric unmanned aerial vehicle: the amount of electricity needed by the electric unmanned aerial vehicle to land from the present position can be set as the first-level alarm electricity, and the amount of electricity needed by the electric unmanned aerial vehicle to return from the present position to the preset position can be set as the second-level alarm electricity. Different safety protection measures can be performed in accordance with different levels of warning electricity. For instance, if the present remaining electricity amount of the battery drops to the first-level alarm electricity, the electric unmanned aerial vehicle can be automatically controlled to land from the present position, thereby an emergent protection measures is performed to the electric unmanned aerial vehicle; and if the present remaining electricity amount of the battery drops to the second-level alarm electricity, the electric unmanned aerial vehicle can be controlled to perform an automatic return flight or to continue a normal flight, so as to further improve the utilization of the battery.

(5) Two different levels of alarm electricity are set in the intelligent method of managing electricity for an electric unmanned aerial vehicle. The amount of electricity needed by the electric unmanned aerial vehicle to land from the present position can be set as the first-level alarm electricity. A determination can be made with first priority on whether the present remaining electricity amount of the battery drops to the first-level alarm electricity, so as to improve a efficiency in controlling the electricity of the electric unmanned aerial vehicle.

In some embodiment, the method can further comprise: automatically performing a command of returning to the preset position or reminding a user whether to perform the command of returning to the preset position, if the present remaining electricity amount is not greater than the amount of electricity needed by the electric unmanned aerial vehicle to return from the present position to the preset position.

In some embodiments, the process of calculating the amount of electricity needed by the electric unmanned aerial vehicle to land from the present position can comprises: obtaining an initial amount of electricity of the battery and a flight time, and calculating an electricity consumption rate of the battery under current flight parameters; calculating a vertical height of the electric unmanned aerial vehicle from the present position to a take-off point based on coordination information of the take-off point and the coordinate information of the present position; calculating a time needed by the electric unmanned aerial vehicle to land from the present position based on the vertical height; calculating the amount of electricity needed by the electric unmanned aerial vehicle to land from the present position based on (1) the electricity consumption rate of the battery under current flight parameters, (2) and the time needed by the electric unmanned aerial vehicle to land from the present position.

In some embodiments, the amount of electricity needed by the electric unmanned aerial vehicle to land from the present position comprises a reserved electricity.

In some embodiments, a path for the electric unmanned aerial vehicle to return from the present position to the preset position can be one of an original flight path, a linear path in a horizontal direction and a linear path in a vertical direction between the present position and the preset position, or a linear path between the present position and the preset position.

In some embodiments, in the process of calculating the amount of electricity needed by the electric unmanned aerial vehicle to return from the present position to the preset position, the electric unmanned aerial vehicle can automatically select a return path according to a preset criterion, and calculate an amount of electricity needed by the electric unmanned aerial vehicle to return from the present position to the preset position based on the selected return path.

In some embodiments, the preset criterion can comprise at least one of a path having the least electricity consumption, a path having the shortest return trip, or a path having the least speed changes.

In some embodiments, the preset criterion can be a path having the least electricity consumption, the process of calculating the amount of electricity needed by the electric unmanned aerial vehicle to return from the present position to the preset position can comprises: calculating an electricity consumption of the electric unmanned aerial vehicle along various paths from the present position to the preset position; and calculating an return path electricity consumption of different paths, the return path electricity consumption comprising an electricity consumption corresponding to a path, and automatically selecting a path having the least return path electricity consumption as the return path.

In some embodiments, a path of the electric unmanned aerial vehicle to return from the present position to the preset position can be automatically set or set by a user.

In some embodiments, the process of calculating the amount of electricity needed by the electric unmanned aerial vehicle to return from the present position to the preset position can comprises: obtaining an initial amount of electricity of the battery and a flight time, and calculating an electricity consumption rate of the battery under current flight parameters; calculating a horizontal distance and a vertical height of the electric unmanned aerial vehicle to return from the present position to the preset position based on the coordinate information of the present position and the coordinate information of the preset position; calculating a time needed by the electric unmanned aerial vehicle to return from the present position to the preset position based on the horizontal distance and the vertical height; and calculating the amount of electricity needed by the electric unmanned aerial vehicle to return from the present position to the preset position based on (1) the electricity consumption rate of the battery under current flight parameters, and (2) the time needed by the electric unmanned aerial vehicle to return from the present position to the preset position.

In some embodiments, the process of calculating the amount of electricity needed by the electric unmanned aerial vehicle to return from the present position to the preset position can comprise calculating an amount of electricity needed for the horizontal distance and calculating an amount of electricity needed for the vertical height, the amount of electricity needed for the horizontal distance can comprise a first reserved electricity, and the amount of electricity needed for the vertical height can comprise a second reserved electricity.

In some embodiments, the preset position can be a waypoint in a flight path which is recorded by the electric unmanned aerial vehicle, and the process of calculating the amount of electricity needed by the electric unmanned aerial vehicle to return from the present position to the preset position can comprise: obtaining an initial amount of electricity of the battery and a flight time, and calculating an electricity consumption rate of the battery under current flight parameters; calculating a total distance for the electric unmanned aerial vehicle to return from the present position to the preset position along the original flight path based on the coordinate information of the present position and the coordinate information of the preset position; calculating a time needed by the electric unmanned aerial vehicle to return from the present position to the preset position along the original flight path based on the total distance of the electric unmanned aerial vehicle to return from the present position to the preset position along the original flight path; and calculating an amount of electricity needed by the electric unmanned aerial vehicle to return from the present position to the preset position along the original flight path based on (1) the electricity consumption rate of the battery under current flight parameters, and (2) the time needed by the electric unmanned aerial vehicle to return from the present position to the preset position along the original flight path.

In some embodiments, the amount of electricity needed by the electric unmanned aerial vehicle to return from the present position to the preset position along the original flight path can comprise a reserved electricity.

In some embodiments, a time needed by the electric unmanned aerial vehicle during landing can be calculated based on a total descending height and a descending speed of the electric unmanned aerial vehicle. In the process of descending, the vertical speed of the electric unmanned aerial vehicle can vary at a plurality of preset heights.

In some embodiments, the plurality of preset heights can comprise a first preset height and a second preset height. The electric unmanned aerial vehicle can descend to the first preset height at a uniform speed, gradually decelerate and descend to the second preset height, and descend to the ground at a uniform speed.

In some embodiments, the first preset height and the second preset height can be measured by a distance-measuring sensor carried by the electric unmanned aerial vehicle, or set by a user in advance according to a total descending height.

In some embodiments, the electricity consumption rate of the battery under the present flight parameters can be obtained by measuring the present remaining electricity amount multiple times at a preset time interval $\Delta t$ and averaging the plurality of measurements. An electricity consumption rate at the $n^{th}$ preset time interval $\Delta t$ is $(Q0-Qn)/n \times \Delta t$, where $Q0$ is the initial amount of electricity of the battery, and $Qn$ is a present remaining electricity amount of the battery as measured after the $n^{th}$ preset time interval $\Delta t$.

In some embodiments, the preset position can be a take-off point of the electric unmanned aerial vehicle or a target point specified by a user.

In some embodiments, the present remaining electricity amount of the battery can be calculated by subtracting a preset electricity from an actual remaining electricity amount of the battery, and the preset electricity can be used as a compensation for a computing error of the safety electricity amount.

In some embodiments, the present remaining electricity amount of the battery can be obtained by sampling a voltage with an AD sampling circuit and/or by measuring a current with a current meter.

The present disclosure also provides an electric unmanned aerial vehicle comprising a position sensor configured to obtain coordinate information of a present position of the electric unmanned aerial vehicle in real-time, a memory storing coordinate information of a preset position of the electric unmanned aerial vehicle, and a controller in communication with the position sensor and the memory and being configured to calculate a safety electricity amount needed by the electric unmanned aerial vehicle to perform a safety protection command based on the coordinate information of the present position and the coordinate information of the preset position, compare the safety electricity amount with a present remaining electricity amount of a battery of the electric unmanned aerial vehicle, and perform a safety protection command if the present remaining electricity amount is not greater than the safety electricity amount.

Exemplary advantages of the above-described electric unmanned aerial vehicle are discussed below.

(1) The position sensor of the above-described electric unmanned aerial vehicle can measure the coordinate information of the present position of the electric unmanned aerial vehicle in real-time. The controller can obtain the coordinate information of the present position of the electric unmanned aerial vehicle in-real time, and calculate the safety electricity amount needed by the electric unmanned aerial vehicle to perform a safety protection command at the present position. If the present remaining electricity amount of the battery is not greater than the safety electricity amount, the controller can immediately perform a corresponding safety protection command, such that the electric unmanned aerial vehicle can be protected in real-time, and an accident due to insufficient electricity of the electric unmanned aerial vehicle can be prevented.

(2) The controller of the above-described electric unmanned aerial vehicle can automatically determine whether a safety protection command is needed based on the safety electricity amount at the present position and the present remaining electricity amount of the battery. The user does not need to make the determination by himself/herself, such that the above-described electric unmanned aerial vehicle can be automatically protected and provided with an intelligent protection function.

(3) The position sensor of the above-described electric unmanned aerial vehicle can measure the coordinate information of the present position of the electric unmanned aerial vehicle in real-time. The safety electricity amount can be updated in real-time based on a change in the coordinate information of the present position. The electric unmanned aerial vehicle does not need to perform an early return flight or an early landing, such that a utilization of the battery can be improved.

(4) The controller of the above-described electric unmanned aerial vehicle can implement two different levels of alarm electricity amount. If the present remaining electricity amount of the battery is only enough for a return flight to the preset position, there is a possibility that the electric unmanned aerial vehicle cannot return successfully if a normal flight is continued. In this situation, the controller can automatically implement a return flight or continue the normal flight, according to the user's setting. If the present remaining electricity amount of the battery is only enough to support a landing to the ground, the controller can implement an automatic landing function.

In some embodiments, the position sensor comprises at least one of a GPS sensor or a height sensor.

In some embodiments, the height sensor comprises at least one of a barometric altimeter, a laser altimeter, a radio altimeter, an ultrasound wave altimeter, or an image distance-measuring sensor.

In some embodiments, the controller comprises a computing unit configured to calculate the safety electricity amount and a comparator configured to determine a relation between the present remaining electricity amount of the battery and the safety electricity amount. In some embodiments, the controller comprises a microprocessor configured to calculate the safety electricity amount and determine the relation between the present remaining electricity amount and the safety electricity amount.

In some embodiments, the controller comprises an electricity detecting circuit configured to detect the present remaining electricity amount in real-time.

In some embodiments, the electricity detecting circuit includes at least one of an analog-digital sampling circuit or a current meter.

In some embodiments, the battery includes a smart battery configured to detect the present remaining electricity amount and the controller is in communication with the smart battery to obtain the present remaining electricity amount.

In some embodiments, the safety electricity amount comprises at least one of a return electricity amount needed by the electric unmanned aerial vehicle to return from the present position to the preset position, a landing electricity amount needed by the electric unmanned aerial vehicle to land directly from the present position, or a deploying electricity amount needed by the electric unmanned aerial vehicle to deploy a safety device, and the safety protection command comprises at least one of a command of returning to the preset position, a command of landing directly from the present position, or a command of deploying the safety device.

In some embodiments, the safety electricity amount comprises a return electricity amount needed by the electric unmanned aerial vehicle to return from the present position to the preset position.

In some embodiments, the controller is configured to perform a command of landing from the present position if the present remaining electricity amount is not greater than the landing electricity amount.

In some embodiments, the safety electricity amount further comprises a landing electricity amount needed by the electric unmanned aerial vehicle to land directly from the present position, and the controller is further configured to control the electric unmanned aerial vehicle to continue a normal flight if the present remaining electricity amount is greater than the return electricity amount and the landing electricity amount.

In some embodiments, the controller is further configured to automatically perform the command of returning to the preset position if the present remaining electricity amount is greater than the landing electricity amount but not greater than the return electricity amount.

In some embodiments, the electric unmanned aerial vehicle further comprises a sensor configured to detect an obstacle in a preset range around the electric unmanned aerial vehicle. The controller is further configured to plan a return path that avoids the obstacle.

wherein the sensor comprises at least one of an infrared distance-measuring sensor, an ultrasound wave distance-measuring sensor, an image distance-measuring sensor, a laser distance-measuring sensor, or a microwave radar distance-measuring sensor.

In some embodiments, the controller is further configured to select a return path for the electric unmanned aerial vehicle to return from the present position to the preset position as one of: an original flight path, a combination of a linear path in a horizontal direction and a linear path in a vertical direction between the present position and the preset position, and a direct linear path between the present position and the preset position.

In some embodiments, the return path is automatically set by the controller or set by a user.

In some embodiments, the controller is configured to automatically select the return path according to a preset criterion, and calculate the return electricity amount based on the selected return path.

In some embodiments, the preset criterion comprises at least one of a path having a least electricity consumption, a path having a shortest return trip, or a path having a least speed change.

In some embodiments, the electric unmanned aerial vehicle further comprises a prompting device in communication with the controller and configured to provide a prompting signal as to whether to perform a return to the preset position if the present remaining electricity amount is greater than the landing electricity amount but not greater than the return electricity amount.

In some embodiments, the controller is further configured to calculate the present remaining electricity amount by subtracting a preset electricity amount from an actual remaining electricity amount of the battery.

DETAILED DESCRIPTION OF THE EMBODIMENTS

Figure 1:
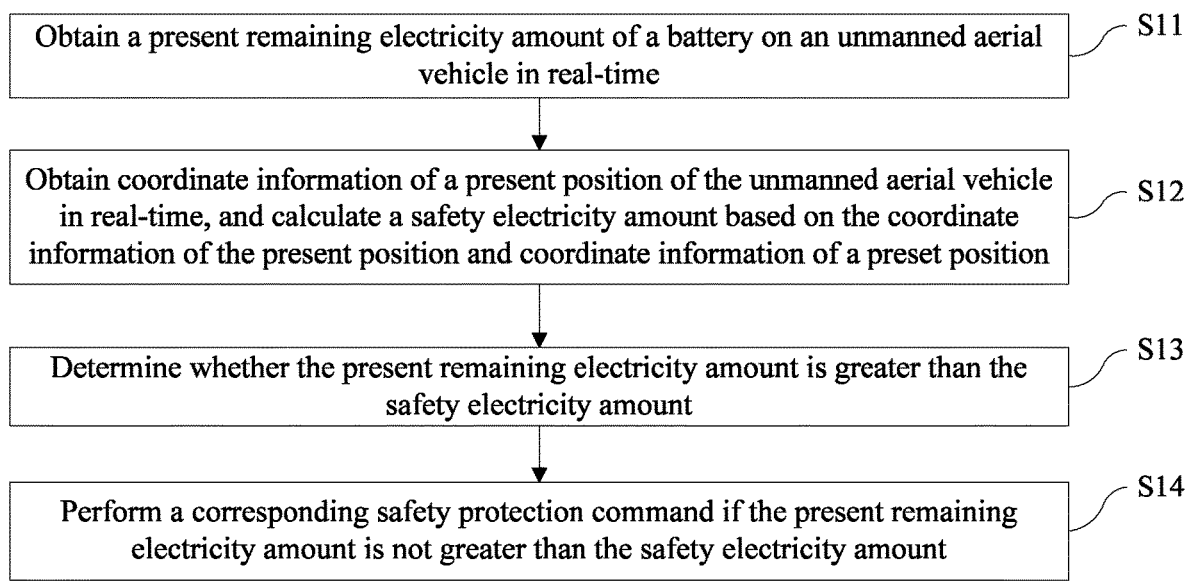
FIG. 1 is a flow chart of an intelligent method of managing electricity for an electric unmanned aerial vehicle, according to an embodiment of the present disclosure.

Exemplary embodiments will be described in detail below with reference to the drawings. It should be appreciated that embodiments described herein are only some but not all embodiments of the present disclosure. Other embodiments obtained by those having ordinary skill in the art on the basis of the described embodiments of the present disclosure without any inventive efforts should fall within the scope of the present disclosure.

The present disclosure provides an intelligent method of protecting electricity, i.e., a method of managing electricity or a method of electricity management, for an electric unmanned aerial vehicle. A remaining flight time of the electric unmanned aerial vehicle, e.g., corresponding to a remaining amount of electricity of a battery of the electric unmanned aerial vehicle, can be calculated based on information such as a voltage and/or a current of the battery. The term "battery" as used herein may refer to a battery, a battery core, a battery pack, or battery packs, or any combination thereof. Meanwhile, a time for performing a safety protection command, which corresponds to a safety amount of electricity, also referred to as a "safety electricity amount," by the electric unmanned aerial vehicle at present position can be calculated based on a present state of the electric unmanned aerial vehicle. Corresponding protection measures can be automatically performed in view of the amount of present remaining electricity, also referred to as a "present remaining electricity amount" or a "present electricity amount," of the battery and the safety electricity amount, to prevent flight accidents due to insufficient electricity in the battery.

In some embodiments, the electric unmanned aerial vehicle can be a single-rotor unmanned aerial vehicle or a multi-rotor unmanned aerial vehicle (for example, a quad-rotor unmanned aerial vehicle or a six-rotor unmanned aerial vehicle). In some embodiments, the electric unmanned aerial vehicle can be a fixed wing unmanned aerial vehicle.

In some embodiments, the safety electricity amount can be an amount of electricity needed by the electric unmanned aerial vehicle to land directly from the present position, also referred to as a "landing electricity amount." In some embodiments, the safety electricity amount can be an amount of electricity needed by the electric unmanned aerial vehicle to return to a destination (e.g., a HOME point) from the present position, also referred to as a "return electricity amount." In some embodiments, the safety electricity amount can be an amount of electricity needed by the electric unmanned aerial vehicle to deploy a safety device (for example, a parachute or a safety airbag), also referred to as a "deploying electricity amount." The safety electricity amount can be a combination of those described above. The safety electricity amount is not limited to those described above. For example, the safety electricity amount can be an amount of electricity needed by the electric unmanned aerial vehicle to descend from the present position to a safety height.

Different safety protection commands can be performed according to different definitions of the safety electricity amount. For example, if the safety electricity amount is defined as the amount of electricity needed by the electric unmanned aerial vehicle to land directly from the present position, i.e., the landing electricity amount, then the safety protection command can be a command of immediately landing from the present position. In some embodiments, if the safety electricity amount is defined as the amount of electricity needed by the electric unmanned aerial vehicle to return to a preset position from the present position, i.e., the return electricity amount, then the safety protection command can be a command of immediately returning to the preset position from the present position. In some embodiments, if the safety electricity amount is defined as a time needed by the electric unmanned aerial vehicle to deploy a safety device, i.e., the deploying electricity amount, the safety protection command can be a command of immediately deploying the safety device.

The safety electricity amount can also be a combination of above-described types of electricity. For example, the safety electricity amount can comprise the amount of electricity needed by the electric unmanned aerial vehicle to land directly from the present position and the amount of electricity needed by the electric unmanned aerial vehicle to return to the preset position from the present position. In this circumstance, the following judgement can be performed to determine a safety protection command: (a) if the present remaining electricity amount of the battery is not greater than the amount of electricity needed by the electric unmanned aerial vehicle to land directly from the present position, then the command of landing directly from the present position can be perform; (b) if the present remaining electricity amount of the battery is greater than the amount of electricity needed by the electric unmanned aerial vehicle to land directly from the present position and not greater than the amount of electricity needed by the electric unmanned aerial vehicle to return to the preset position from the present position, then the command of returning to the preset position can be performed; and (c) if the present remaining electricity amount of the battery is greater than the amount of electricity needed by the electric unmanned aerial vehicle to return to the preset position from the present position, then the electric unmanned aerial vehicle can continue an ordinary flight, also referred to as a "normal flight."

In some embodiments, the preset position to which the electric unmanned aerial vehicle returns can be a take-off point, i.e., a point from which the electric unmanned aerial vehicle took off. In some embodiments, the preset position is can be a position specified by a user. The preset position is not limited to above-described positions. For example, if the electric unmanned aerial vehicle is provided with a sensor capable of exploring a geographical appearance of ground, the preset position to which the electric unmanned aerial vehicle returns can be an optimal landing point which is automatically determined by the electric unmanned aerial vehicle.

In some embodiments, the safety electricity amount of the electric unmanned aerial vehicle can be continuously obtained and judged, until a safety protection command is performed. In some embodiments, the safety electricity amount of the electric unmanned aerial vehicle can be obtained and judged at a predetermined time interval (for example, every 5 seconds), until a safety protection command is performed.

In some embodiments, a safety protection command can be automatically performed by the electric unmanned aerial vehicle. In some embodiments, a safety protection command can be prompted to the user by a prompting device, and the user can then control the electric unmanned aerial vehicle to perform the safety protection command.

In some embodiments, the present remaining electricity amount of the battery can be an amount of electricity value that is actually measured. In some embodiments, the present remaining electricity amount of the battery can be an amount of electricity obtained by subtracting a reserved amount of electricity from the actually-measured electricity.

In some embodiments, the present remaining electricity amount of the battery can be measured by measuring a voltage of the battery. In some embodiments, the present remaining electricity amount of the battery can be measured by measuring a current of the battery. The method of measuring the present remaining electricity amount of a battery is not limited to the above described methods. For example, the present remaining electricity amount of the battery can be measured by a combination of the voltage and the current.

In some embodiments, a path for the electric unmanned aerial vehicle to return from the present position to the preset position, also referred to as a return path, can be any one of an original flight path, a combination of a linear path in a horizontal direction (also referred to as a "horizontal linear path") and a linear path in a vertical direction (also referred to as a "vertical linear path") between the present position and the preset position, or a linear path between the present position and the preset position (also referred to as a "direct linear path").

The path of the electric unmanned aerial vehicle to return to the preset position from the present position can be automatically set. In some embodiments, the return path can be set by the user.

In some embodiments, the amount of electricity needed by the electric unmanned aerial vehicle to land directly from the present position and the amount of electricity needed by the electric unmanned aerial vehicle to return to the preset position from the present position can be calculated based on (1) an average electricity consumption rate of the battery, (2) a time needed for directly landing from the present position, and (3) a time needed for returning to the preset position from the present position. The needed electricity can also be obtained in a different way. For example, the needed electricity can be obtained based on an average amount of electricity consumed at a unit height under current flight parameters, an average amount of electricity consumed at a unit horizontal distance under current flight parameters, a height difference and a horizontal difference between the present position and the preset return position, and a reserved amount of electricity.

Exemplary embodiments of the present disclosure will be described in details with reference to the drawings.

Referring to FIG. 1, an intelligent method of managing electricity for an electric unmanned aerial vehicle according to an embodiment of the present disclosure is described.

At S11, a present remaining electricity amount of a battery of the electric unmanned aerial vehicle can be obtained in real-time.

The present remaining electricity amount of the battery can be measured in various manners. For example, the present remaining electricity amount of the battery can be obtained by sampling a voltage with an analog-digital (AD) sampling circuit and/or by measuring a current with a current meter.

In some embodiments, the present remaining electricity amount of the battery can be measured by a voltage sampling method. The electricity of the battery can be measured as an amount of electric charge that the battery can deliver, which can be measured in the unit of, e.g., AH. A voltage across a sampling device can be sampled by the AD sampling circuit. The sampling device can be electrically connected to a negative terminal of the battery. The present current can be calculated using $I=U/R$, where I denotes the current, U denotes the voltage across the sampling device, and R denotes a resistance of the sampling device. An amount of electricity in terms of the amount of electric charge can be calculated by multiplying a current and a time. A controller can sample the present remaining electricity amount periodically, for example, at every time interval t. Thus, a change in the electricity during a charging process or a discharging process can be calculated using $\Delta Q = \Sigma I \times t$, where $\Sigma$ means a summation of the electricity changes over these time intervals, and $\Delta Q$ has a positive value in a charging process and a negative value in a discharging process. If an original amount of electricity of the battery before the charging/discharging process is $Q_{orig}$, then the present electricity amount can be calculated using $Q = \Delta Q + Q_{orig}$. If a total battery capacity, i.e., the total amount of electricity in the battery when the battery is fully charged, is $Q_{ALL}$, then the remaining percentage, p, of electricity can be calculated using $p = Q/Q_{ALL}$.

In some embodiments, the present remaining electricity amount of the battery can be measured by a current sampling method. A current through the sampling device can be directly sampled by the current meter. The present remaining electricity amount of the battery can be calculated based on the relationship between the electricity and the current discussed above.

In some embodiments, the present remaining electricity amount of the battery can be measured by a combination of a voltage sampling method and a current sampling method. A voltage on an output terminal of the battery can be sampled by the AD sampling circuit, and a current through the sampling device can be sampled by the current meter. In these embodiments, the electricity of the battery can be expressed as the amount of electrical energy contained in the battery rather than the amount of electric charge as discussed above. For the purposes of description, however, symbol Q and related symbols such as $Q_{orig}$ and $\Delta Q$ are also used to denote the electricity expressed as the amount of electrical energy. In these embodiments, the change in the electricity during the charging or the discharging process in terms of electrical energy can be calculated using $\Delta Q = \Sigma Pt = \Sigma U_b It$, where P denotes the power of the battery, t denotes the sampling interval as discussed above, $U_b$ denotes the voltage of the battery as measured by the AD sampling circuit at the output terminal of the battery, and I denotes the current passing through the sampling device, which is the same as the current passing through the battery. The present electricity amount and the remaining percentage can be calculated in a similar manner as that discussed above.

At S12, coordinate information of a present position of the electric unmanned aerial vehicle can be obtained in real-time, and a safety electricity amount needed by the electric unmanned aerial vehicle to perform a safety protection command at the present position can be calculated based on the coordinate information of the present position of the electric unmanned aerial vehicle and coordinate information of the preset position.

The safety electricity amount can be defined in various manners. For example, the safety electricity amount can be an amount of electricity needed by the electric unmanned aerial vehicle to return to the preset position from the present position, an amount of electricity needed by the electric unmanned aerial vehicle to land directly from the present position, or a combination of the amount of electricity needed to return to the preset position from the present position and the amount of electricity needed to land directly from the present position.

Different safety protection commands can be performed according to different definitions of the safety electricity amount. For example, if the safety electricity amount is defined as the amount of electricity needed by the electric unmanned aerial vehicle to return to the preset position from the present position, then the safety protection command can be a command of returning to the preset position. If the safety electricity amount is defined as the amount of electricity needed by the electric unmanned aerial vehicle to land directly from the present position, then the safety protection command can be a command of landing directly from the present position.

Figure 2:
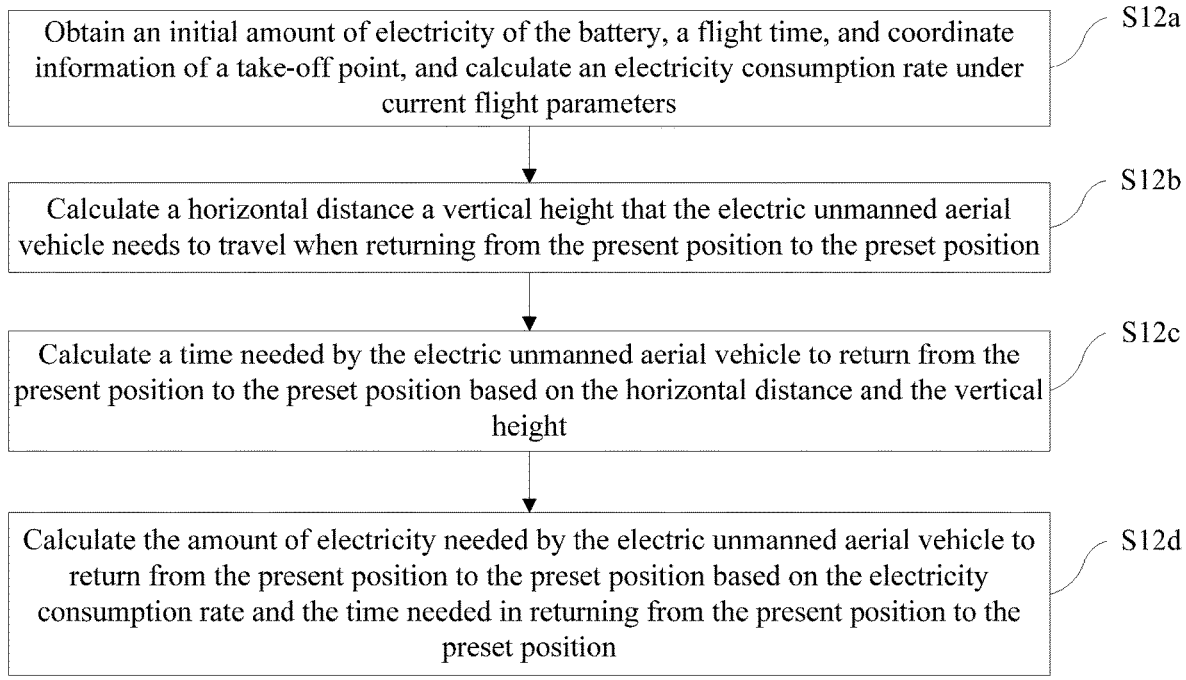
FIG. 2 is a flow chart of calculating an amount of electricity needed for a safe return, in the intelligent method of managing electricity for an electric unmanned aerial vehicle of FIG. 1.

According to different definitions, the safety electricity amount can be calculated differently. For example, FIG. 2 shows an exemplary method for calculating the safety electricity amount if the safety electricity amount is defined as the amount of electricity needed by the electric unmanned aerial vehicle to return to the preset position from the present position.

At S12a, an initial amount of electricity of the battery, a flight time, and coordinate information of a take-off point can be obtained, and an electricity consumption rate of the battery under current flight parameters can be calculated. The initial amount of electricity refers to the amount of electricity of the battery at the beginning of the flight.

The initial amount of electricity of the battery, the flight time, and coordinate information of the take-off point can be stored in a memory on the electric unmanned aerial vehicle. An amount of consumed electricity of the battery can be calculated based on the initial amount of electricity of the battery and the flight time. The amount of consumed electricity of the battery can correspond to the flight time. For example, the amount of consumed electricity can be calculated at a predetermined time interval.

In some embodiments, the electricity consumption rate of the battery can be calculated by averaging a plurality of measurement results, such that the electricity consumption rate of the battery under the present flight parameters can be obtained with improved accuracy. For example, the electricity consumption rate of the battery under the present flight parameters can be obtained by measuring the present remaining electricity amount at a preset time interval $\Delta t$ and then averaging the plurality of measurement results. The electricity consumption rate at the $n^{th}$ preset time interval $\Delta t$ can be calculated as $(Q0-Qn)/(n \times \Delta t)$, where Q0 is the initial amount of electricity of the battery, and Qn is the present remaining electricity amount of the battery as measured after the $n^{th}$ preset time interval $\Delta t$. In other words, the electricity consumption rate at the $1^{th}$ preset time interval $\Delta t$ is $(Q0-Q1)/\Delta t$, where Q1 is the present remaining electricity amount of the battery as measured after the $1^{st}$ preset time interval $\Delta t$. The electricity consumption rate at the $2^{nd}$ preset time interval $2\Delta t$ is $(Q0-Q2)/2\Delta t$. The electricity consumption rates at the $3^{rd}$ preset time interval $3\Delta t$ and so on can be calculated in a similar manner. The preset time interval $\Delta t$ can be set in view of different situations. For example, the preset time interval $\Delta t$ can be 5 seconds.

At S12b, a horizontal distance and a vertical height that the electric unmanned aerial vehicle needs to travel when returning from the present position to the preset position, i.e., the horizontal distance and vertical distance, respectively, between the present position and the preset position, can be calculated based on the coordinate information of the preset position and the coordinate information of the present position.

The coordinate information of the present position and the preset position can be obtained by a GPS sensor, an altitude sensor, and so on. The horizontal distance and the vertical height from the present position to the preset position can be calculated based on the coordinate information of the present position and the preset position.

In some embodiments, the coordinate information of the preset position can be stored in the memory on the electric unmanned aerial vehicle in advance. In some embodiments, the coordinate information of the preset position can be inputted by a user. The plane coordinates of the present position on a horizontal plane can be obtained using the GPS sensor. The horizontal distance of the electric unmanned aerial vehicle in returning from the present position to the preset position can be calculated based on the plane coordinates of the present position on the horizontal plane and the plane coordinates of the preset position on the horizontal plane. The height coordinate of the present position in a vertical direction can be obtained by a distance-measuring sensor, such as a laser distance-measuring sensor and so on. The vertical height of the electric unmanned aerial vehicle in returning from the present position to the preset position can be calculated based on the height coordinates of the preset position and the present position in the vertical direction.

In some embodiments, the coordinate information of the preset position can be stored in the memory on the electric unmanned aerial vehicle in advance. In some embodiments, the coordinate information of the preset position can be inputted by a user. The plane coordinates of the present position on the horizontal plane can be obtained using the GPS sensor. The horizontal distance of the electric unmanned aerial vehicle in returning from the present position to the preset position can be calculated based on the plane coordinates of the present position on the horizontal plane and the plane coordinates of the preset position on the horizontal plane. The height coordinate of the present position in the vertical direction can be obtained using the altitude sensor, such as a barometric altimeter, a radio altimeter, and so on. The vertical height from the present position to the preset position can be calculated based on the height coordinates of the present position and the preset position in the vertical direction. In case the preset position is not the take-off point (for example, the preset position can be a position reset by the user), the vertical height from the present position to the take-off point can be used as the vertical height from the present position to the position reset by the user.

At S12c, a time needed by the electric unmanned aerial vehicle to return from the present position to the preset position can be calculated based on the horizontal distance and the vertical height.

The time needed by the electric unmanned aerial vehicle to fly over the horizontal distance, also referred to as a "horizontal flight time," can be calculated based on the horizontal distance and a horizontal speed of the electric unmanned aerial vehicle. For example, horizontal flight time=horizontal distance/horizontal speed. The electric unmanned aerial vehicle can fly at a uniform speed in the horizontal direction. For example, the electric unmanned aerial vehicle can fly horizontally at a speed of 8 m/s.

The time needed for the electric unmanned aerial vehicle to descend the vertical height, also referred to as a "vertical flight time," can be calculated based on the vertical height and a vertical speed of the electric unmanned aerial vehicle. For example, vertical flight time=vertical height/vertical speed. In the process of descending, the vertical speed of the electric unmanned aerial vehicle can vary at a plurality of preset heights. In some embodiments, the plurality of preset heights can comprise a first preset height and a second preset height. The electric unmanned aerial vehicle can descend to the first preset height at a uniform speed, gradually decelerate while descending to the second preset height, and then descend to the ground at a uniform speed. For example, the electric unmanned aerial vehicle can descend to a height of 15 m at a speed of 2 m/s, and descend to the height of 5 m while gradually decelerating to 0.5 m/s, and then descend to the ground at a uniform speed of 0.5 m/s.

It should be appreciated that, the first preset height and the second preset height can be measured using a distance-measuring sensor (such as a radio distance-measuring sensor, a laser distance-measuring sensor, and so on) on the electric unmanned aerial vehicle. In some embodiments, the first preset height and the second preset height can be set by the user in advance, in view of a total descending height.

At S12d, the amount of electricity needed by the electric unmanned aerial vehicle to return from the present position to the preset position can be calculated based on (1) the electricity consumption rate of the battery under the current flight parameters, and (2) the time needed by the electric unmanned aerial vehicle in returning from the present position to the preset position.

The amount of electricity needed by the electric unmanned aerial vehicle to return from the present position to the preset position can be obtained by multiplying the electricity consumption rate of the battery under the current flight parameters by the time needed by the electric unmanned aerial vehicle in returning from the present position to the preset position, which includes a flight time over the vertical height, i.e., the vertical flight time, and a flight time over the horizontal distance, i.e., the horizontal flight time. For example, return electricity amount=electricity consumption rate×(vertical flight time+horizontal flight time).

Figure 3:
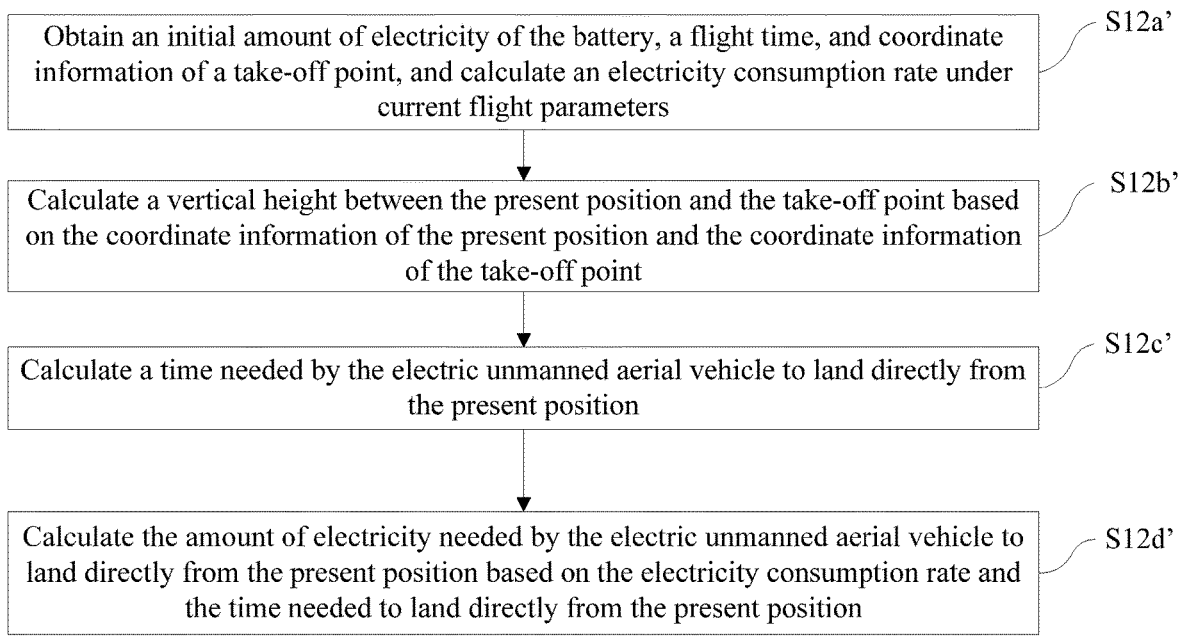
FIG. 3 is a flow chart of calculating an amount of electricity needed for a safe landing, in the intelligent method of managing electricity for an electric unmanned aerial vehicle of FIG. 1.

FIG. 3 shows an exemplary method for calculating the safety electricity amount if the safety electricity amount is defined as the amount of electricity needed by the electric unmanned aerial vehicle to land directly from the present position.

At S12a', the initial amount of electricity of the battery the flight time, and the coordinate information of the take-off point can be obtained, and the electricity consumption rate of the battery under the current flight parameters can be calculated.

The initial amount of electricity of the battery, the flight time, and the coordinate information of the take-off point can be stored in the memory on the electric unmanned aerial vehicle. The amount of consumed electricity of the battery can be calculated based on the initial amount of electricity of the battery and the flight time. The amount of consumed electricity of the battery can correspond to the flight time. For example, the amount of consumed electricity can be calculated at a predetermined time interval.

In some embodiments, the electricity consumption rate of the battery can be calculated by averaging a plurality of measurement results, such that the electricity consumption rate of the battery under the present flight parameters can be obtained with an improved accuracy. For example, the electricity consumption rate of the battery under the present flight parameters can be obtained by measuring the present remaining electricity amount at a preset time interval $\Delta t$ and then averaging the plurality of measurement results. The electricity consumption rate at the $n^{th}$ preset time interval $\Delta t$ can be calculated as $(Q0-Qn)/(n \times \Delta t)$, where Q0 is the initial amount of electricity of the battery, and Qn is the present remaining electricity amount of the battery as measured after the $n^{th}$ preset time interval $\Delta t$. In other words, the electricity consumption rate at the $1^{th}$ preset time interval $\Delta t$ is $(Q0-Q1)/\Delta t$, where Q1 is the present remaining electricity amount of the battery as measured after the $1^{th}$ preset time interval $\Delta t$. The electricity consumption rate at the $2^{nd}$ preset time interval $2\Delta t$ is $(Q0-Q2)/2\Delta t$. The electricity consumption rates at the $3^{rd}$ preset time interval $3\Delta t$ and so on can be calculated in a similar manner. The preset time interval $\Delta t$ can be set in view of different situations. For example, the preset time interval $\Delta t$ can be 5 seconds.

At S12b', a vertical height of the electric unmanned aerial vehicle between the present position and the take-off point can be calculated based on the coordinate information of the present position and the coordinate information of the take-off point.

In some embodiments, the vertical height between the present position and the take-off point can be obtained using a height sensor (for example, a barometric altimeter and so on). The vertical height between the present position and the take-off point can be used as the vertical height from the present position to the ground.

At S12c', a time needed by the electric unmanned aerial vehicle to land directly from the present position can be calculated based on the vertical height.

The time needed for the electric unmanned aerial vehicle to descend the vertical height can be calculated based on the vertical height and the vertical speed of the electric unmanned aerial vehicle. For example, vertical flight time=vertical height/vertical speed. In the process of descending, the vertical speed of the electric unmanned aerial vehicle can vary at a plurality of preset heights. In some embodiments, the plurality of preset heights can comprise a first preset height and a second preset height. The electric unmanned aerial vehicle can descend to the first preset height at a uniform speed, gradually decelerate while descending to the second preset height, and then descend to the ground at a uniform speed. For example, the electric unmanned aerial vehicle can descend to a height of 15 m at a speed of 2 m/s, and descend to a height of 5 m while gradually decelerating to 0.5 m/s, and then descend to the ground at a uniform speed of 0.5 m/s.

It should be appreciated that, the first preset height and the second preset height can be measured using a distance-measuring sensor (such as a laser distance-measuring sensor and so on) on the electric unmanned aerial vehicle. In some embodiments, the first preset height and the second preset height can be set by the user in advance, in view of a total descending height.

Step S12d', the amount of electricity needed by the electric unmanned aerial vehicle to land directly from the present position can be calculated based on (1) the electricity consumption rate of the battery under the current flight parameters, and (2) the time needed by the electric unmanned aerial vehicle to land directly from the present position.

The amount of electricity needed by the electric unmanned aerial vehicle to land directly from the present position can be obtained by multiplying the electricity consumption rate of the battery under the current flight parameters and the time needed by the electric unmanned aerial vehicle to land directly from the present position. For example, landing electricity amount=electricity consumption rate×vertical flight time.

It should be appreciated that, the amount of electricity needed by the electric unmanned aerial vehicle to return from the present position to the preset position and the amount of electricity needed by the electric unmanned aerial vehicle to land directly from the present position can be calculated in various ways in addition to the above-described methods. For example, the amount of electricity needed by the electric unmanned aerial vehicle to land directly from the present position can be calculated by (1) measuring an actual height from the present position to the ground using a distance-measuring sensor, and (2) calculating the amount of electricity needed to land directly from the present position based on the actual height. As another example, if the preset position is a waypoint in the flight path which is recorded by the electric unmanned aerial vehicle, then the electric unmanned aerial vehicle can return to the preset position along the original flight path, i.e., the recorded flight path, and thus in calculating the amount of electricity needed by the electric unmanned aerial vehicle to return from the present position to the preset position, the total distance of the actual return flight can be calculated according to the original flight path.

In some embodiments, if the preset position is a waypoint in the flight path which is recorded by the electric unmanned aerial vehicle, the process of calculating the amount of electricity needed by the electric unmanned aerial vehicle to return safely from the present position to the preset position can further comprise: obtaining the initial amount of electricity of the battery and the flight time, calculating the electricity consumption rate of the battery under the current flight parameters; calculating a total distance for the electric unmanned aerial vehicle to return from the present position to the preset position along the original flight path, based on the coordinate information of the present position and the preset position and trip information of the original flight path; calculating a time needed by the electric unmanned aerial vehicle to return from the present position to the preset position along the original flight path, based on the total distance for the electric unmanned aerial vehicle to return from the present position to the preset position along the original flight path; and calculating the amount of electricity needed by the electric unmanned aerial vehicle to return from the present position to the preset position along the original flight path, based on the electricity consumption rate of the battery under the current flight parameters and the time needed by the electric unmanned aerial vehicle to return from the present position to the preset position along the original flight path.

In some embodiments, if the return path is a direct linear path between the present position and the preset position, the process of calculating the amount of electricity needed by the electric unmanned aerial vehicle to return from the present position to the preset position can further comprise: obtaining the initial amount of electricity of the battery and the flight time, and calculating the electricity consumption rate of the battery under the current flight parameters; calculating a direct linear distance from the present position of the electric unmanned aerial vehicle to the preset position, based on the coordinate information of the present position and the preset position; calculating a time needed by the electric unmanned aerial vehicle to return from the present position to the preset position along the direct linear path, based on the direct linear distance from the present position of the electric unmanned aerial vehicle to the preset position; and calculating the amount of electricity needed by the electric unmanned aerial vehicle to return to the preset position from the present position along the direct linear path, based on the electricity consumption rate of the battery under the current flight parameters and the time needed by the electric unmanned aerial vehicle to return from the present position to the preset position along the direct linear path.

In some embodiments, to return to the preset position from the present position, the electric unmanned aerial vehicle can automatically select a return path according to a preset criterion, and calculate the amount of electricity needed by the electric unmanned aerial vehicle to return from the present position to the preset position along the selected return path. The return path of the electric unmanned aerial vehicle from the present position to the preset position can be any one of the original flight path, the combination of the horizontal linear path and the vertical linear path from the present position to the preset position, the direct linear path between the present position and the preset position, and so on. The preset criterion can be a path having the least electricity consumption, a path having the shortest return trip, a path having the least speed changes, and so on. In some embodiment, two or more criteria can be set for choosing the return path.

In some embodiments, if the preset criterion is a path having the least electricity consumption, the process of calculating the amount of electricity needed by the electric unmanned aerial vehicle to return from the present position to the preset position can comprise: calculating an electricity consumption of the electric unmanned aerial vehicle along each of various paths from the present position to the preset position; and calculating a return flight electricity amount, i.e., the amount of electricity needed by the unmanned aerial vehicle to return from the present position to the preset position, for each of the various paths according to the electricity consumption corresponding to the path, and automatically selecting a path having the least return flight electricity as the return path. In some embodiments, the return flight electricity amount for a path can comprise the electricity consumption corresponding to the path.

In some embodiments, in order to compensate for an error in calculation, the amount of electricity needed by the electric unmanned aerial vehicle to return from the present position to the preset position can further comprise a reserved electricity amount, in addition to the electricity consumption corresponding to the return path.

The errors in calculating the amount of electricity needed by the electric unmanned aerial vehicle to return from the present position to the preset position and the amount of electricity needed by the electric unmanned aerial vehicle to land directly from the present position can be compensated by introducing the reserved electricity amount. In other words, a predetermined amount of electricity can be reserved for the amount of electricity needed by the electric unmanned aerial vehicle to return from the present position to the preset position, i.e., return electricity amount=calculated electricity amount+reserved electricity amount. Similarly, a predetermined amount of electricity can be reserved for the amount of electricity needed by the electric unmanned aerial vehicle to land directly from the present position, i.e., landing electricity amount=calculated electricity amount+reserved electricity. The calculated electricity amount can be the calculated amount of electricity consumption for returning to the preset position or the calculated amount of electricity consumption for landing directly from the present position, as the case may be.

In some embodiments, calculating the amount of electricity needed by the electric unmanned aerial vehicle to return from the present position to the preset position can comprise calculating the amount of electricity needed for the horizontal distance and calculating the amount of electricity needed for the vertical height. The amount of electricity needed for the horizontal distance can comprise a first reserved electricity amount. The amount of electricity needed for the vertical height can comprise a second reserved electricity amount. For example, an amount of electricity of 2% of the total battery capacity can be reserved for the amount of electricity needed for the horizontal distance, i.e., the first reserved electricity amount can be 2% of the total battery capacity. Similarly, 2% of the total battery capacity can be reserved for the amount of electricity needed for the vertical height, i.e., the second reserved electricity amount can be 2% of the total battery capacity.

In some embodiments, in calculating the amount of electricity needed by the electric unmanned aerial vehicle to land directly from the present position, the amount of electricity needed by the electric unmanned aerial vehicle to land directly from the present position can comprise a reserved electricity amount. For example, the reserved electricity amount can be 2% of the total battery capacity.

In some embodiments, in calculating the amount of electricity needed by the electric unmanned aerial vehicle to return from the present position to the preset position along the original flight path, the amount of electricity needed by the electric unmanned aerial vehicle to return from the present position to the preset position along the original flight path can comprise a reserved electricity amount. For example, the reserved electricity amount can be 2% of the total battery capacity.

In some embodiments, the present remaining electricity amount of the battery can be calculated by subtracting a preset electricity amount from actual remaining electricity amount of the battery. The preset electricity amount can be used as a compensation for a computation error of the safety electricity amount. For example, present remaining electricity amount=actual remaining electricity amount−preset electricity amount. For example, the preset electricity amount can be 10% of the total battery capacity.

Referring again to FIG. 1, at S13, whether the present remaining electricity amount of the battery is greater than the safety electricity amount can be determined.

In some embodiments, if the safety electricity amount is defined as the amount of electricity needed by the electric unmanned aerial vehicle to return from the present position to the preset position, a comparison of the amount of electricity needed by the electric unmanned aerial vehicle to return from the present position to the preset position with the present remaining electricity amount of the battery can be performed.

In some embodiments, if the safety electricity amount is defined as the amount of electricity needed by the electric unmanned aerial vehicle to land directly from the present position, a comparison of the amount of electricity needed by the electric unmanned aerial vehicle to land directly from the present position with the present remaining electricity amount of the battery can be performed.

In some embodiments, if the safety electricity amount is defined as comprising the amount of electricity needed by the electric unmanned aerial vehicle to return from the present position to the preset position and the amount of electricity needed by the electric unmanned aerial vehicle to land directly from the present position, a comparison of the present remaining electricity amount of the battery with the amount of electricity needed by the electric unmanned aerial vehicle to return from the present position to the preset position and a comparison of the present remaining electricity amount of the battery with the amount of electricity needed by the electric unmanned aerial vehicle to land directly from the present position can be respectively performed.

At S14, a corresponding safety protection command can be immediately performed if the present remaining electricity amount of the battery is not greater than the safety electricity amount.

In some embodiments, if the present remaining electricity amount of the battery is not greater than the amount of electricity needed for returning from the present position to the preset position, the command of returning to the preset position can be performed immediately.

In some embodiments, if the present remaining electricity amount of the battery is not greater than the amount of electricity needed for the electric unmanned aerial vehicle to land directly from the present position, the command of landing directly from the current can be performed immediately.

Exemplary advantages of the above-described intelligent methods of managing electricity for an electric unmanned aerial vehicle are discussed below.

(1) According to the above-described intelligent methods of managing electricity for an electric unmanned aerial vehicle, a safety electricity amount needed by the electric unmanned aerial vehicle to perform a safety protection command at a present position can be calculated by obtaining coordinate information of the present position of the electric unmanned aerial vehicle in real-time. If a present remaining electricity amount of the battery is not greater than the safety electricity amount, a corresponding safety protection command can be immediately performed, such that the electric unmanned aerial vehicle can be protected in real-time, and be prevented from accidents due to an insufficient electricity of the electric unmanned aerial vehicle.

(2) According to the above-described intelligent methods of managing electricity for an electric unmanned aerial vehicle, a determination can be automatically made on whether a safety protection command is to be performed based on a comparison of the safety electricity amount of the present position with the present remaining electricity amount of the battery. The user does not need to make the determination by himself/herself, such that the electric unmanned aerial vehicle can be protected more effectively and intelligently with the above-described intelligent methods of managing electricity.

(3) According to the above-described intelligent methods of managing electricity for an electric unmanned aerial vehicle, the safety electricity amount can be updated in real-time based on the coordinate information of the present position. The electric unmanned aerial vehicle does not need to perform an early return flight or an early landing, such that a utilization of the battery can be improved.

Figure 4:
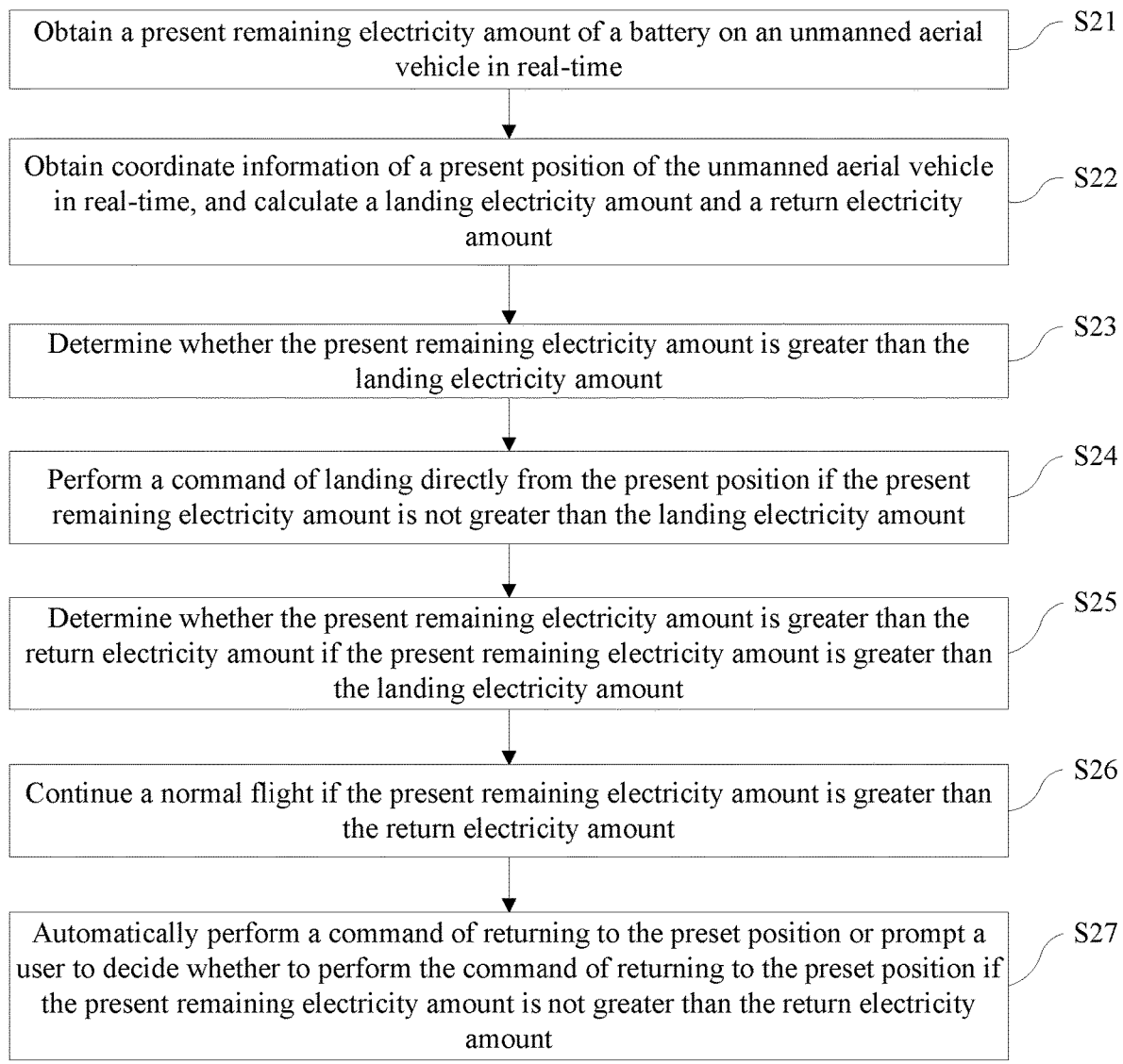
FIG. 4 is a flow chart of an intelligent method of managing electricity for an electric unmanned aerial vehicle, according to another embodiment of the present disclosure.
Figure 5:
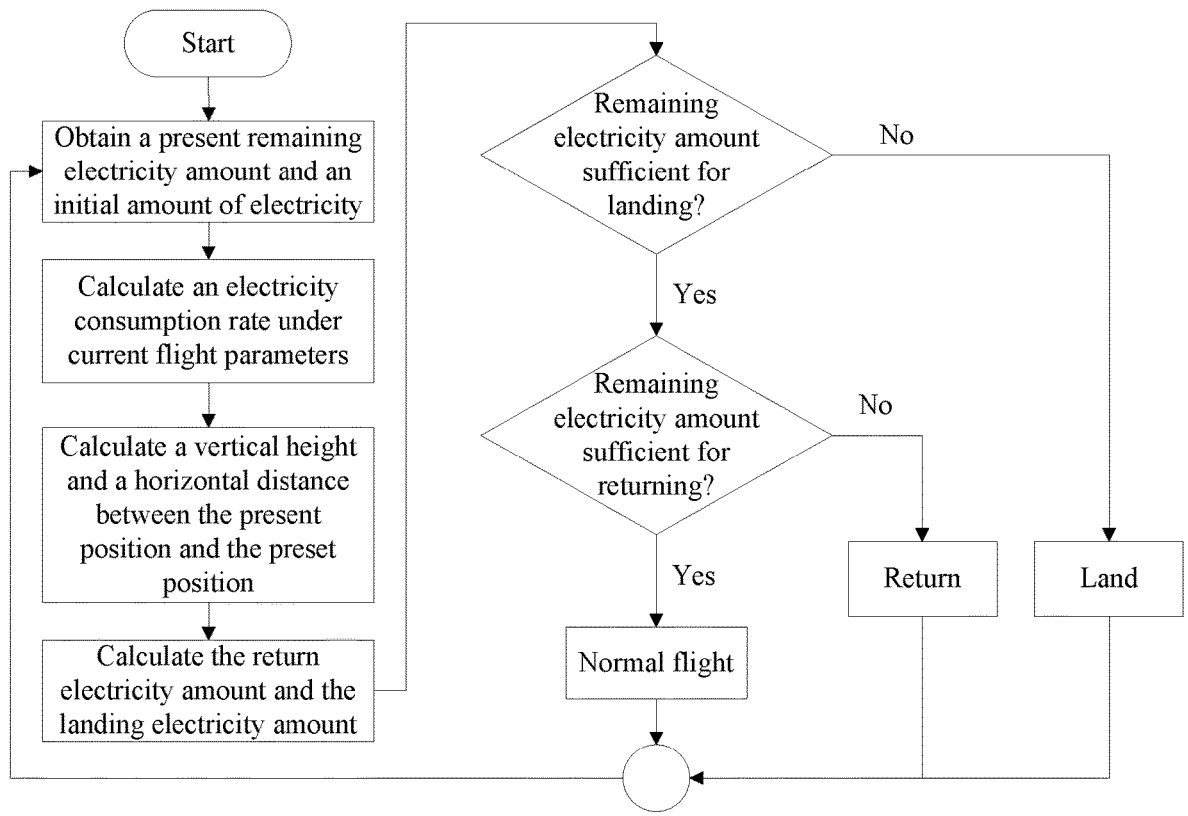
FIG. 5 is a flow chart of calculating and judging processes in the intelligent method of managing electricity for an electric unmanned aerial vehicle, according to another embodiment of the present disclosure.

Referring to FIG. 4 and FIG. 5, an intelligent method of managing electricity for an electric unmanned aerial vehicle according to another embodiment of the present disclosure are described below.

In process S21, a present remaining electricity amount of a battery of the electric unmanned aerial vehicle can be obtained in real-time.

The present remaining electricity amount of the battery can be measured in various manners. For example, the present remaining electricity amount of the battery can be obtained by sampling a voltage with an analog-digital (AD) sampling circuit and/or by measuring a current with a current meter.

In some embodiments, the present remaining electricity amount of the battery can be measured by a voltage sampling method. The electricity of the battery can be measured as an amount of electric charge that the battery can deliver, which can be measured in the unit of, e.g., AH. A voltage across a sampling device can be sampled by the AD sampling circuit. The sampling device can be electrically connected to a negative terminal of the battery. The present current can be calculated using $I=U/R$, where I denotes the current, U denotes the voltage across the sampling device, and R denote a resistance of the sampling device. An amount of electricity in terms of the amount of electric charge can be calculated by multiplying a current and a time. A controller can sample the present remaining electricity amount periodically, for example, at every time interval t. Thus, a change in the electricity during a charging process or a discharging process can be calculated using $\Delta Q=\Sigma I \times t$, where $\Sigma$ means a summation of the electricity changes over these time intervals, and $\Delta Q$ has a positive value in a charging process and a negative value in a discharging process. If original electricity of the battery before the charging/discharging process is $Q_{orig}$, then the present electricity amount can be calculated using $Q=\Delta Q+Q_{orig}$. If a total battery capacity, i.e., the total amount of electricity in the battery when the battery is fully charged, is $Q_{ALL}$, then the remaining percentage, p, of electricity can be calculated using $p=Q/Q_{ALL}$.

In some embodiments, the present remaining electricity amount of the battery can be measured by a current sampling method. A current through the sampling device can be directly sampled by the current meter. The present remaining electricity amount of the battery can be calculated based on the relationship between the electricity and the current discussed above.

In some embodiments, the present remaining electricity amount of the battery can be measured by a combination of a voltage sampling method and a current sampling method. A voltage on an output terminal of the battery can be sampled by the AD sampling circuit, and a current through the sampling device can be sampled by the current meter. In these embodiments, the electricity of the battery can be expressed as the amount of electrical energy contained in the battery rather than the amount of electric charge as discussed above. For the purposes of description, however, symbol Q and related symbols such as $Q_{orig}$ and $\Delta Q$ are also used to denote the electricity expressed as the amount of electrical energy. In these embodiments, the change in the electricity during the charging or the discharging process in terms of electrical energy can be calculated using $\Delta Q=\Sigma Pt=\Sigma U_b It$, where P denotes the power of the battery, t denotes the sampling interval as discussed above, $U_b$ denotes the voltage of the battery as measured by the AD sampling circuit at the output terminal of the battery, and I denotes the current passing through the sampling device, which is the same as the current passing through the battery. The present electricity amount and the remaining percentage can be calculated in a similar manner as that discussed above.

At S22, coordinate information of a present position of the electric unmanned aerial vehicle can be obtained in real-time, and an amount of electricity needed by the electric unmanned aerial vehicle to land directly from the present position, i.e., a landing electricity amount, and an amount of electricity needed by the electric unmanned aerial vehicle to return from the present position to a preset position, i.e., a return electricity amount, can be calculated based on the present position coordinates of the electric unmanned aerial vehicle and coordinate information of the preset position.

Methods of calculating the amount of electricity needed by the electric unmanned aerial vehicle to return to the preset position from the present position and methods of calculating the amount of electricity needed by the electric unmanned aerial vehicle to land directly from the present position can be similar to the intelligent methods of managing electricity for an electric unmanned aerial vehicle described above, and thus a detailed description thereof is omitted here.

It will be appreciated that, the preset position can be a take-off point of the electric unmanned aerial vehicle or a target point specified by the user.

At S23, a determination is made as to whether the present remaining electricity amount is greater than the amount of electricity needed by the electric unmanned aerial vehicle to land directly from the present position.

In some embodiments, the amount of electricity needed by the electric unmanned aerial vehicle to land directly from the present position can be set as a first-level alarm electricity amount of the safety electricity amount of the electric unmanned aerial vehicle. A determination can be first made as to whether the present remaining electricity amount is greater than the amount of electricity needed by the electric unmanned aerial vehicle to land directly from the present position. This can help to protect the electric unmanned aerial vehicle effectively in an emergency.

At S24, a command of landing directly from the present position can be automatically performed if the present remaining electricity amount is not greater than the amount of electricity needed by the electric unmanned aerial vehicle to land directly from the present position.

Since the amount of electricity needed by the electric unmanned aerial vehicle to land directly from the present position is set as the first-level alarm electricity amount for the safety electricity amount of the electric unmanned aerial vehicle, when the present remaining electricity amount of the battery is lower than or equal to the first-level alarm electricity amount, the electric unmanned aerial vehicle can be set to "automatically" perform the safety protection command, such that the electric unmanned aerial vehicle can be protected more effectively.

At S25, if the present remaining electricity amount is greater than the amount of electricity needed by the electric unmanned aerial vehicle to land directly from the present position, then a determination is made as to whether the present remaining electricity amount is greater than the amount of electricity needed by the electric unmanned aerial vehicle to return from the present position to the preset position.

In some examples, the amount of electricity needed by the electric unmanned aerial vehicle to return from the present position to the preset position can be set as a second-level alarm electricity amount for the safety electricity amount of the electric unmanned aerial vehicle. In case the present remaining electricity amount has not dropped below the first-level alarm electricity amount, a determination can be made as to whether the present remaining electricity amount is greater than the amount of electricity needed by the electric unmanned aerial vehicle to return from the present position to the preset position. This can help to further improve the utilization of the battery.

At S26, if the present remaining electricity amount is greater than the amount of electricity needed by the electric unmanned aerial vehicle to return from the present position to the preset position, the electric unmanned aerial vehicle can continue a normal flight.

Since the amount of electricity needed by the electric unmanned aerial vehicle to return from the present position to the preset position is set as the second-level alarm electricity amount for the safety electricity amount of the electric unmanned aerial vehicle, when the present remaining electricity amount of the battery is greater than the second-level warning electricity amount, the electric unmanned aerial vehicle can continue the normal flight.

In some embodiments, as shown in FIG. 4, at S27, if the present remaining electricity amount is not greater than the amount of electricity needed by the electric unmanned aerial vehicle to return from the present position to the preset position, a command of returning to the preset position can be automatically performed, or the user can be prompt to decide whether to perform the command of returning to the preset position.

Since the amount electricity needed by the electric unmanned aerial vehicle to return from the present position to the preset position is set as the second-level alarm electricity amount for the safety electricity amount of the electric unmanned aerial vehicle, the second-level alarm electricity amount can be ignored if the present remaining electricity amount has not dropped below the first-level alarm electricity, and the electric unmanned aerial vehicle can continue the normal flight. This can help to further improve the utilization of the battery. For example, if the present remaining electricity amount is not greater than the amount of electricity needed by the electric unmanned aerial vehicle to return from the present position to the preset position, the user can be prompted of whether to perform the command of returning to the preset position, such that the user can make a decision in view of an actual situation.

Exemplary advantages of the above-described intelligent methods of managing electricity for an electric unmanned aerial vehicle are discussed below.

(1) According to the above-described intelligent methods of managing electricity for an electric unmanned aerial vehicle, a safety electricity amount needed by the electric unmanned aerial vehicle to perform a safety protection command at a present position can be calculated by obtaining coordinate information of the present position of the electric unmanned aerial vehicle in real-time. If a present remaining electricity amount of the battery is not greater than the safety electricity amount, a corresponding safety protection command can be immediately performed, such that the electric unmanned aerial vehicle can be protected in real-time, and be prevented from accidents due to an insufficient electricity of the electric unmanned aerial vehicle.

(2) According to the above-described intelligent methods of managing electricity for an electric unmanned aerial vehicle, a determination can be automatically made on whether a safety protection command is to be performed based on a comparison of the safety electricity amount of the present position with the present remaining electricity amount of the battery. The user does not need to make the determination by himself/herself, such that the electric unmanned aerial vehicle can be protected more effectively and intelligently with the above-described intelligent methods of managing electricity.

(3) According to the above-described intelligent methods of managing electricity for an electric unmanned aerial vehicle, the safety electricity amount can be updated in real-time based on the coordinate information of the present position. The electric unmanned aerial vehicle does not need to perform an early return flight or an early landing, such that a utilization of the battery can be improved.

(4) Two different levels of alarm electricity amount are set in the intelligent methods of managing electricity for an electric unmanned aerial vehicle. That is, the amount of electricity needed by the electric unmanned aerial vehicle to land directly from the present position can be set as the first-level alarm electricity amount, and the amount of electricity needed by the electric unmanned aerial vehicle to return from the present position to the preset position can be set as the second-level alarm electricity amount. As such, different safety protection measures can be performed in accordance with different levels of alarm electricity amount. For example, if the present remaining electricity amount of the battery drops to the first-level alarm electricity amount, the electric unmanned aerial vehicle can be automatically controlled to land directly from the present position, thereby an emergent protection measure is performed to the electric unmanned aerial vehicle. If the present remaining electricity amount of the battery drops to the second-level alarm electricity amount, the electric unmanned aerial vehicle can be controlled to perform an automatic return flight or to continue a normal flight, and thus the utilization of the battery can be further improved.

(5) Two different levels of alarm electricity amounts are set in the intelligent methods of managing electricity for an electric unmanned aerial vehicle. The amount of electricity needed by the electric unmanned aerial vehicle to land directly from the present position can be set as the first-level alarm electricity amount, and a determination can be made with a priority as to whether the present remaining electricity amount of the battery drops to the first-level alarm electricity amount. As such, an efficiency in controlling the electricity of the electric unmanned aerial vehicle can be improved.

Based on the above-described intelligent methods of managing electricity, the present disclosure further provides an electric unmanned aerial vehicle in which the above-described intelligent methods of managing electricity can be performed. A configuration of the electric unmanned aerial vehicle according to an embodiment of the present disclosure will be described below with reference to the drawings.

Figure 6:
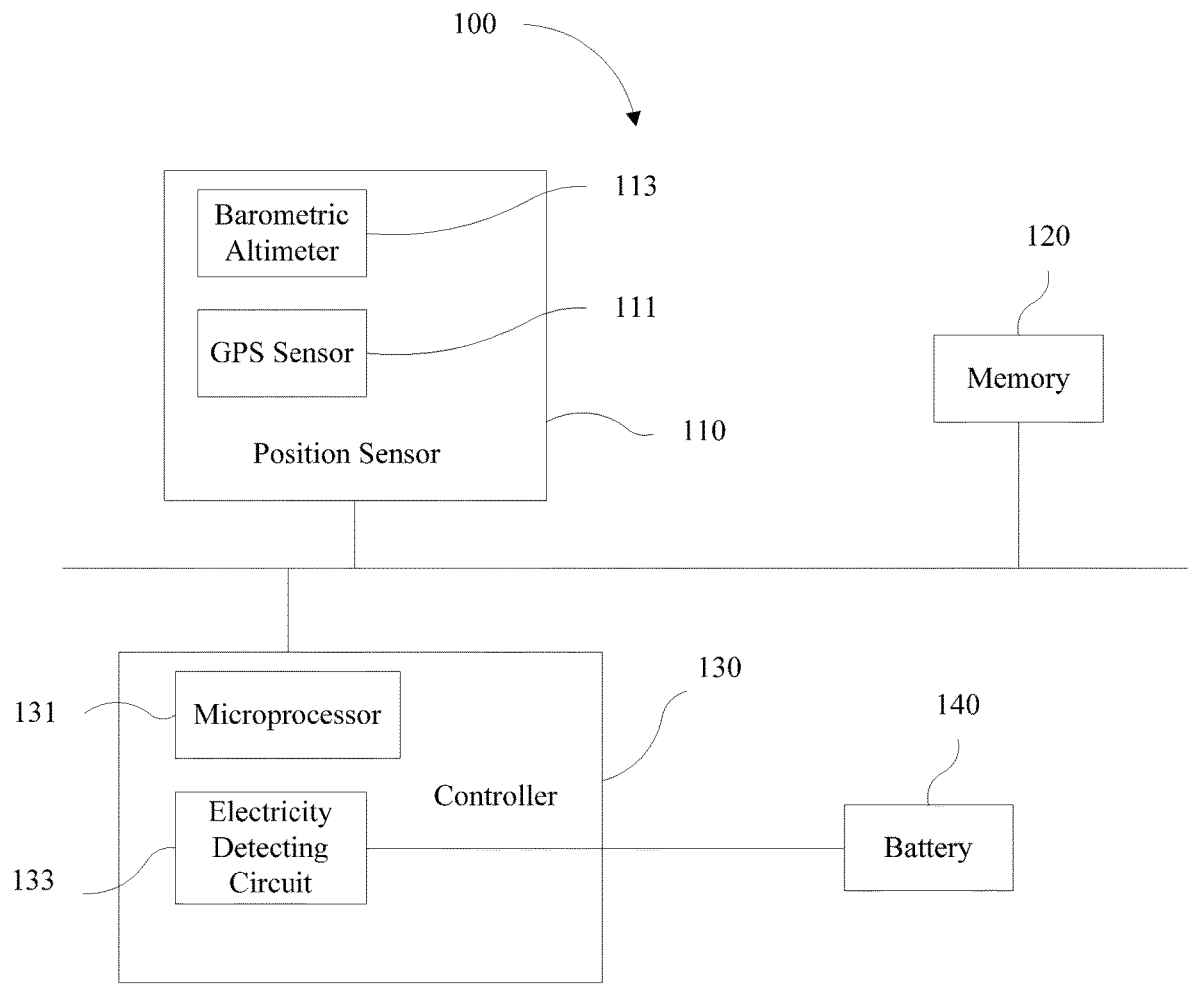
FIG. 6 is a schematic view of an electric unmanned aerial vehicle, according to an embodiment of the present disclosure.

Referring to FIG. 6, an electric unmanned aerial vehicle 100 according to an embodiment of the present disclosure can comprise a position sensor 110, a memory 120, and a controller 130.

The position sensor 110 can be configured to obtain in real-time coordinate information of a present position of the electric unmanned aerial vehicle 100. The position sensor 110 can comprise at least one of a GPS sensor or a height sensor. The height sensor can comprise at least one of a barometric altimeter, a laser altimeter, a radio altimeter, an ultrasonic wave altimeter, or an image distance-measuring sensor.

In some embodiments, the position sensor 110 can comprise a GPS sensor 111 and a barometric altimeter 113. Horizontal coordinate information of the present position can be obtained using the GPS sensor 111, and height coordinate information of the present position can be obtained using the barometric altimeter 113. In some embodiments, the position sensor 110 can comprise a GPS sensor that can sense both the horizontal coordinate information and the height coordinate information of the present position.

The memory 120 can be configured to store coordinate information of a preset position of the electric unmanned aerial vehicle 100. For example, the memory 120 can be an SD memory card, a storage hard disc, and so on.

In some embodiments, if the preset position is not a take-off point, then the memory can store coordinate information of the take-off point of the electric unmanned aerial vehicle 100.

The controller 130 can be configured to communicate with the position sensor 110 and the memory 120. The controller 130 can be configured to calculate a safety electricity amount needed by the electric unmanned aerial vehicle 100 to perform a safety protection command at the present position, based on the coordinate information of the present position and the coordinate information of the preset position of the electric unmanned aerial vehicle 100, and to compare the safety electricity amount with a present remaining electricity amount of a battery 140.

In some embodiments, if the present remaining electricity amount of the battery 140 is not greater than the safety electricity amount, then the controller 130 can perform a corresponding safety protection command.

The safety electricity amount can comprise at least one of an amount of electricity needed by the electric unmanned aerial vehicle 100 to return from the present position to the preset position, an amount of electricity needed by the electric unmanned aerial vehicle 100 to land directly from the present position, or an amount of electricity needed by the electric unmanned aerial vehicle 100 to deploy a safety device. Correspondingly, the safety protection command can comprise at least one of a command of immediately returning to the preset position, a command of immediately landing directly from the present position, or a command of immediately deploying the safety device.

For example, in some embodiments, the safety electricity amount can comprise the amount of electricity needed by the electric unmanned aerial vehicle 100 to return from the present position to the preset position. If the present remaining electricity amount of the battery 140 is not greater than the amount of electricity needed by the electric unmanned aerial vehicle 100 to return from the present position to the preset position, the controller 130 can automatically perform the command of landing directly from the present position.

In some embodiments, the present remaining electricity amount of the battery 140 can be an amount of electricity obtained by subtracting a preset electricity amount from an actual remaining electricity amount of the battery 140, where the preset electricity amount can be used as a compensation for a computation error of the safety electricity amount.

In some embodiments, the safety electricity amount can also comprise an amount of electricity needed by the electric unmanned aerial vehicle 100 to return from the present position to the preset position. If the present remaining electricity amount of the battery 140 is greater than (1) the amount of electricity needed by the electric unmanned aerial vehicle 100 to return from the present position to the preset position, and (2) the amount of electricity needed by the electric unmanned aerial vehicle 100 to land directly from the present position, then the controller 130 can control the electric unmanned aerial vehicle 100 to continue a normal flight.

If the present remaining electricity amount of the battery 140 is greater than the amount of electricity needed by the electric unmanned aerial vehicle 100 to land directly from the present position, but is not greater than the amount of electricity needed by the electric unmanned aerial vehicle to return from the present position to the preset position, the controller 130 can selectively perform a corresponding safety protection command, or automatically perform a corresponding safety protection command.

For example, in some embodiments, if the present remaining electricity amount of the battery 140 is greater than the amount of electricity needed by the electric unmanned aerial vehicle 100 to land directly from the present position, but is not greater than the amount of electricity needed by the electric unmanned aerial vehicle 100 to return from the present position to the preset position, the controller 130 can automatically perform a command of returning to the preset position.

In some embodiments, the electric unmanned aerial vehicle 100 can further comprise a prompting device which is in communication with the controller 130. If the present remaining electricity amount of the battery 140 is greater than the amount of electricity needed by the electric unmanned aerial vehicle 100 to land directly from the present position, but is not greater than the amount of electricity needed by the electric unmanned aerial vehicle 100 to return from the present position to the preset position, the controller 130 can control the prompting device to provide a prompting signal as to whether the electric unmanned aerial vehicle should return to the preset position.

The user can select to perform the command of returning to the preset position, or cancel the command of returning to the preset position and instruct the electric unmanned aerial vehicle to continue the normal flight.

The prompting device can be designed to satisfy various requirements. For example, the prompting device can be a display on a remote controller, and the prompt information can be displayed on the display screen. For another example, the prompting device can be an alerting lamp such as a red LED, and a prompting function can be achieved by flashing of the alerting lamp.

In some embodiments, the electric unmanned aerial vehicle 100 can comprise a sensor (not shown) configured to detect obstacles in a preset range around the electric unmanned aerial vehicle 100. If the sensor detects an obstacle in the preset range around the electric unmanned aerial vehicle 100, the controller 130 can automatically plan a return path. For example, the sensor can be an infrared distance-measuring sensor, an ultrasound wave distance-measuring sensor, an image distance-measuring sensor, a laser distance-measuring sensor, a microwave radar distance-measuring sensor, and so on.

In some embodiments, in performing the command of returning to the preset position, the controller 130 can control the electric unmanned aerial vehicle 100 to return along an original flight path or along a return path automatically planned by the controller 130 to avoid any obstacle.

A flight path of the electric unmanned aerial vehicle 100 in returning from the present position to the preset position can be any one of the original flight path, a combination of a linear path in a horizontal direction and a linear path in a vertical direction between the present position and the preset position, or a linear path between the present position and the preset position.

The flight path of the electric unmanned aerial vehicle 100 in returning from the present position to the preset position can be automatically set by the controller. In some embodiments, the flight path can be set by the user. In automatically setting a return path, the controller 130 can automatically select a return path according to a preset criterion, and calculate the amount of electricity needed by the electric unmanned aerial vehicle 100 to return from the present position to the preset position based on the selected return path. For example, the preset criterion can comprise at least one of a path having a least electricity consumption, a path having a shortest return trip, or a path having a least speed change.

The controller 130 can be designed to satisfy various requirements. For example, in some embodiments, as shown in FIG. 6, the controller 130 can comprise a microprocessor 131 configured to calculate the safety electricity amount needed to protect the electric unmanned aerial vehicle 100 based on coordinate information of the present position and coordinate information of the preset position of the electric unmanned aerial vehicle 100, and determine a relation between the present remaining electricity amount of the battery 140 and the safety electricity amount.

In some embodiments, the controller 130 can comprise a computing unit configured to calculate the safety electricity amount needed to protect the electric unmanned aerial vehicle 100 based on the coordinate information of the present position and the coordinate information of the preset position of the electric unmanned aerial vehicle 100, and a comparator configured to determine the relation between the present remaining electricity amount of the battery 140 and the safety electricity amount. For example, the computing unit can be a microprocessor, a calculator integrated circuit, and so on.

In obtaining the present remaining electricity amount of the battery 140, the controller 130 can detect the present remaining electricity amount in real-time with an internal circuit or with an external circuit. For example, in some embodiments, as shown in FIG. 6, the controller 130 can further comprise an electricity detecting circuit 133 for detecting the present remaining electricity amount of the battery 140 in real-time. The controller 130 can obtain the present remaining electricity amount of the battery 140 using the electricity detecting circuit 133. The electricity detecting circuit 133 can be an AD sampling circuit and/or a current meter.

In some embodiments, the battery 140 can be a smart battery which is capable of automatically detecting the present remaining electricity amount. The controller 130 can be in communication with the smart battery to obtain the present remaining electricity amount thereof.

Exemplary advantages of the above-described electric unmanned aerial vehicle 100 are discussed below.

(1) The position sensor 110 of the above-described electric unmanned aerial vehicle 100 can measure the coordinate information of the present position of the electric unmanned aerial vehicle 100 in real-time. The controller 130 can obtain the coordinate information of the present position of the electric unmanned aerial vehicle 100 in-real time, and calculate the safety electricity amount needed by the electric unmanned aerial vehicle 100 to perform a safety protection command at the present position. If the present remaining electricity amount of the battery 140 is not greater than the safety electricity amount, the controller 130 can immediately perform a corresponding safety protection command, such that the electric unmanned aerial vehicle 100 can be protected in real-time, and an accident due to insufficient electricity of the electric unmanned aerial vehicle 100 can be prevented.

(2) The controller 130 of the above-described electric unmanned aerial vehicle 100 can automatically determine whether a safety protection command is needed based on the safety electricity amount at the present position and the present remaining electricity amount of the battery 140. The user does not need to make the determination by himself/herself, such that the above-described electric unmanned aerial vehicle 100 can be automatically protected and provided with an intelligent protection function.

(3) The position sensor 110 of the above-described electric unmanned aerial vehicle 100 can measure the coordinate information of the present position of the electric unmanned aerial vehicle 100 in real-time. The safety electricity amount can be updated in real-time based on a change in the coordinate information of the present position. The electric unmanned aerial vehicle 100 does not need to perform an early return flight or an early landing, such that a utilization of the battery 140 can be improved.

(4) The controller 130 of the above-described electric unmanned aerial vehicle 100 can implement two different levels of alarm electricity amount. If the present remaining electricity amount of the battery 140 is only enough for a return flight to the preset position, there is a possibility that the electric unmanned aerial vehicle 100 cannot return successfully if a normal flight is continued. In this situation, the controller 130 can automatically implement a return flight or continue the normal flight, according to the user's setting. If the present remaining electricity amount of the battery 140 is only enough to support a landing to the ground, the controller 130 can implement an automatic landing function.

It will be appreciated that the embodiments described above are merely exemplary. Devices and methods consistent with the present disclosure can be implemented in various manners. For example, a division of the modules or units may be merely a division in logic function, and other division manners of the modules or units can be otherwise implemented. In some embodiments, a plurality of units or components can be combined or integrated into another system. In some embodiments, some features can be omitted or not performed. Furthermore, a coupling, a direct coupling or a direct communication connection between modules can be an indirect coupling or an indirect communication connection via an interface. A coupling or a communication connection between modules can be an electrical coupling, a mechanical coupling or a coupling in another form.

Units described as separate parts may or may not be physically separated. Components shown as units may or may not be physical units. For example, they can be located in one place, or can be distributed into a plurality of network units. Some or all of the units can be selected to achieve the objects of the embodiments in view of actual requirements.

Various functional units described in various embodiments of the present disclosure can be integrated into one processing unit. In some embodiments, the various functional units can be physical individuals. Two or more of the various function units can be integrated into one unit. The integrated unit can be implemented in a form of hardware or in a form of software functional units.

If integrated units are implemented in a form of software functional units and sold or used as independent products, they can be stored in a non-transitory computer-readable storage medium. In this aspect, the present disclosure also provides a non-transitory computer-readable storage medium storing instructions that, when executed by a computer or a processor, cause the computer or the processor to perform a method consistent with the present disclosure, such as one of the above-described exemplary methods. The above-mentioned storage medium can comprise various medium capable of storing program codes, such as a USB flash disk, a movable hard disc, a Read-Only Memory (ROM), a random access memory (RAM), a diskette, or an optical disc.

The foregoing disclosure is merely illustrative of the embodiments of the disclosure but is not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. An electric unmanned aerial vehicle, comprising:
   a position sensor configured to obtain coordinate information of a present position of the electric unmanned aerial vehicle in real-time, wherein the coordinate information comprises a plane coordinate on a horizontal plane and a height coordinate in a vertical direction;
   a memory storing coordinate information of a preset position of the electric unmanned aerial vehicle; and
   a controller in communication with the position sensor and the memory, and being configured to:
      calculate a safety electricity amount needed by the electric unmanned aerial vehicle to perform a safety protection command based on the plane coordinate and the height coordinate,
      compare the safety electricity amount with a present remaining electricity amount of a battery of the electric unmanned aerial vehicle, and
      perform, in response to determining that the present remaining electricity amount is not greater than the safety electricity amount, a safety protection command.

2. The electric unmanned aerial vehicle according to claim 1, wherein the position sensor comprises a GPS sensor and a height sensor.

3. The electric unmanned aerial vehicle according to claim 2, wherein the height sensor comprises at least one of a barometric altimeter, a laser altimeter, a radio altimeter, an ultrasound wave altimeter, or an image distance-measuring sensor.

4. The electric unmanned aerial vehicle according to claim 1, wherein the controller comprises:
   a computing unit configured to calculate the safety electricity amount and a comparator configured to determine a relation between the present remaining electricity amount of the battery and the safety electricity amount; or
   a microprocessor configured to calculate the safety electricity amount and determine the relation between the present remaining electricity amount and the safety electricity amount.

5. The electric unmanned aerial vehicle according to claim 1, wherein the controller comprises an electricity detecting circuit configured to detect the present remaining electricity amount in real-time.

6. The electric unmanned aerial vehicle according to claim 5, wherein the electricity detecting circuit includes at least one of an analog-digital sampling circuit or a current meter.

7. The electric unmanned aerial vehicle according to claim 1, wherein:
   the battery includes a smart battery configured to detect the present remaining electricity amount, and
   the controller is in communication with the smart battery to obtain the present remaining electricity amount.

8. The electric unmanned aerial vehicle according to claim 1, wherein:
   the safety electricity amount comprises at least one of a return electricity amount needed by the electric unmanned aerial vehicle to return from the present position to the preset position, a landing electricity amount needed by the electric unmanned aerial vehicle to land directly from the present position, or a deploying electricity amount needed by the electric unmanned aerial vehicle to deploy a safety device, and
   the safety protection command comprises at least one of a command of returning to the preset position, a command of landing directly from the present position, or a command of deploying the safety device.

9. The electric unmanned aerial vehicle according to claim 1, wherein the safety electricity amount comprises a landing electricity amount needed by the electric unmanned aerial vehicle to land directly from the present position.

10. The electric unmanned aerial vehicle according to claim 9, wherein the controller is configured to perform a command of landing directly from the present position in response to determining that the present remaining electricity amount is not greater than the landing electricity amount.

11. The electric unmanned aerial vehicle according to claim 9, wherein:
   the safety electricity amount further comprises a returning electricity amount needed by the electric unmanned aerial vehicle to return from the present position to the preset position, and
   the controller is further configured to control the electric unmanned aerial vehicle to continue a normal flight in response to determining that the present remaining electricity amount is greater than the return electricity amount and the landing electricity amount.

12. The electric unmanned aerial vehicle according to claim 11, wherein the controller is further configured to automatically perform the command of returning to the preset position in response to determining that the present remaining electricity amount is greater than the landing electricity amount but not greater than the return electricity amount.

13. The electric unmanned aerial vehicle according to claim 12, further comprising a sensor configured to detect an obstacle in a preset range around the electric unmanned aerial vehicle,
wherein the controller is further configured to plan a return path that avoids the obstacle.

14. The electric unmanned aerial vehicle according to claim 13, wherein the sensor comprises at least one of an infrared distance-measuring sensor, an ultrasound wave distance-measuring sensor, an image distance-measuring sensor, a laser distance-measuring sensor, or a microwave radar distance-measuring sensor.

15. The electric unmanned aerial vehicle according to claim 12, wherein the controller is further configured to select a return path for the electric unmanned aerial vehicle to return from the present position to the preset position as one of: an original flight path, a combination of a linear path in a horizontal direction and a linear path in a vertical direction between the present position and the preset position, and a direct linear path between the present position and the preset position.

16. The electric unmanned aerial vehicle according to claim 15, wherein the return path is automatically set by the controller or set by a user.

17. The electric unmanned aerial vehicle according to claim 16, wherein the controller is configured to automatically select the return path according to a preset criterion, and calculate the return electricity amount based on the selected return path.

18. The electric unmanned aerial vehicle according to claim 17, wherein the preset criterion comprises at least one of a path having a least electricity consumption, a path having a shortest return trip, or a path having a least speed change.

19. The electric unmanned aerial vehicle according to claim 11, further comprising:
a prompting device in communication with the controller, the prompting device being configured to provide a prompting signal as to whether to perform a return to the preset position in response to determining that the present remaining electricity amount is greater than the landing electricity amount but not greater than the return electricity amount.

20. The electric unmanned aerial vehicle according to claim 1, wherein the controller is further configured to calculate the present remaining electricity amount by subtracting a preset electricity amount from an actual remaining electricity amount of the battery.

* * * * *